US011552351B2

(12) United States Patent
Lu et al.

(10) Patent No.: US 11,552,351 B2
(45) Date of Patent: Jan. 10, 2023

(54) ELECTRICAL CELLS AND BATTERIES, METHOD FOR MANUFACTURING THE SAME AND METHOD FOR IMPROVING THE PERFORMANCES OF ELECTRICAL CELLS AND BATTERIES

(71) Applicant: The Chinese University of Hong Kong, Hong Kong (CN)

(72) Inventors: Yi-Chun Lu, Hong Kong (CN); Zhuojian Liang, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 29 days.

(21) Appl. No.: 16/372,621

(22) Filed: Apr. 2, 2019

(65) Prior Publication Data
US 2019/0312324 A1 Oct. 10, 2019

Related U.S. Application Data

(60) Provisional application No. 62/652,347, filed on Apr. 4, 2018.

(51) Int. Cl.
*H01M 12/02* (2006.01)
*H01M 12/08* (2006.01)
(52) U.S. Cl.
CPC ........... *H01M 12/02* (2013.01); *H01M 12/08* (2013.01)
(58) Field of Classification Search
CPC ...... H01M 12/02; H01M 12/06; H01M 12/08; H01M 4/133
See application file for complete search history.

(56) References Cited

U.S. PATENT DOCUMENTS 7,740,977 B2 * 6/2010 Lepp ................ H01M 8/20
429/81
9,590,230 B2 * 3/2017 Albertus ........... H01M 10/4242
(Continued)

OTHER PUBLICATIONS

Wang et al. "Redox-Mediated ORR and OER Reactions: Redox Flow Lithium Oxygen Batteries Enabled with a Pair of Soluble Redox Catalysts." ACS Catalysis 2016, 6, 6191-6197. (Year: 2016).*
(Continued)

*Primary Examiner* — Michael L Dignan
(74) *Attorney, Agent, or Firm* — Fish & Richardson P.C.

(57) ABSTRACT

Disclosed is an electrical cell comprising a negative electrode, a positive electrode, and a deposition layer separating the positive electrode and a gas phase that supplies at least one reactive gas; wherein the deposition layer and the positive electrode are in communication with each other via electrolyte(s). Also disclosed is a battery comprising the electrical cell described above and a battery comprising: a cell comprising a negative electrode in communication with an anolyte and a positive electrode in communication with a catholyte; and a gas-liquid reactor, which is fed with the catholyte from the cell and a gas. Additionally, also disclosed is a method for improving the performances of a cell or battery comprising a negative electrode, a positive electrode, and a deposition layer separating the positive electrode and a gas phase that supplies at least one reactive gas, wherein the deposition layer and the positive electrode are in communication with each other via electrolyte(s), the method comprising: controlling reaction fronts away from the positive electrode by tuning the flux of compound(s) in the electrolyte(s), which can react with the reactive gas to form a solid, and/or the flux of the reactive gas.

23 Claims, 18 Drawing Sheets

(56) References Cited

U.S. PATENT DOCUMENTS

| | | | | |
|---|---|---|---|---|
| 10,777,836 B1* | 9/2020 | Wei | ............... | H01M 8/04455 |
| 2012/0164498 A1* | 6/2012 | Vincent | ............... | H01M 8/188 |
| | | | | 429/80 |
| 2013/0266836 A1* | 10/2013 | Wang | ............... | H01M 8/188 |
| | | | | 429/105 |
| 2015/0104724 A1* | 4/2015 | Chang | ............... | H01M 8/186 |
| | | | | 429/418 |
| 2017/0237106 A1* | 8/2017 | Wang | ............... | H01M 4/134 |
| | | | | 429/405 |
| 2017/0309981 A1* | 10/2017 | Miller | ............... | H01M 10/4214 |
| 2018/0226632 A1* | 8/2018 | Soavi | ............... | H01M 10/052 |

OTHER PUBLICATIONS

Konig and Leibfried. "Introduction of a flow battery management system (FBMS)." Karlsruhe Institute of Technology, Advanced Battery Power Conference 2015, Aachen (Year: 2015).*

Huang et al. "Capacity Enhancement of a Lithium Oxygen Flow Battery." Electrochimica Acta 174 (2015) 908-918. (Year: 2015).*

Zhu et al. "Dual redox catalysts for oxygen reduction and evolution reactions: towards a redox flow Li—O2 battery." Chem. Commun. 2015, 51, 9451. (Year: 2015).*

Zhu et al. "Synergistic oxygen reduction of dual redox catalysts boosting the power of lithium-air battery." Phys. Chem. Chem. Phys., 2018, 20, 27930 (Year: 2018).*

Gao et al., "A rechargeable lithium-oxygen battery with dual mediators stabilizing the carbon positive electrode," Nat. Energy, 2017, 2:17118.

Liang et al., "Critical role of redox mediator in suppressing charging instabilities of lithium-oxygen batteries," J. Am. Chem. Soc., 2016, 138:7574-7583.

Ottakam et al., "The carbon electrode in nonaqueous Li—O2 cells," J. Am Chem. Soc., 2013, 135:494-500.

Peng et al., "A reversible and higher-rate Li—O2 battery," Science, 2012, 337(6094):563-566.

Thotiyl et al., "A stable positive electrode for the aprotic Li—O2 battery," Nature Materials, 2013, 12(11):1050-1056.

* cited by examiner

ELECTRICAL CELLS AND BATTERIES, METHOD FOR MANUFACTURING THE SAME AND METHOD FOR IMPROVING THE PERFORMANCES OF ELECTRICAL CELLS AND BATTERIES

CROSS-REFERENCE TO RELATED APPLICATIONS

This application claims priority to U.S. Provisional Application 62/652,347, filed on Apr. 4, 2018, the entire content of which is hereby incorporated by reference.

TECHNICAL FIELD

The present disclosure relates to the technical field of electrochemistry, and specifically to electrical cells and batteries, a method for manufacturing the same and a method for improving the performances of electrical cells and batteries.

BACKGROUND ART

Energy storage system is a critical enabling factor for electric vehicles and deploying unstable and intermittent renewable power sources, such as solar and wind power sources. Energy storage devices including metal-gas batteries and flow batteries have received extraordinary attention owing to their attractive energy density and flexibility in scaling power and energy. However, these battery technologies has been suffering from some challenging technical issues, among which the most critical ones being the limited cycle life, stability and reversibility, which significantly hinder their practical application.

A truly reversible and long-life metal-gas battery such as lithium-oxygen ($Li-O_2$) battery has been proven extremely challenging to realize due to the reactive nature of reduced oxygen species. Applying dual redox mediators mitigates positive electrode instabilities. However, it is insufficient to eliminate positive electrode degradation resulting from electrode and electrolyte decomposition. Metal-gas batteries promise one of the high theoretical energy densities among all electrochemical energy storage chemistries. However, the development of practical metal-gas batteries is strongly limited by its poor cycle life due to positive electrode passivation and degradation by parasitic products. These by-products arise from severe side reactions between electrode/electrolyte and the discharge/charge reaction products. For example, in a lithium-oxygen ($Li-O_2$) battery, singlet oxygen, an excited state of $O_2$ that is generated during both discharge and charge, is highly reactive towards the electrolyte. The discharge intermediates in oxygen reduction reaction (ORR), including lithium superoxide and superoxide radical, degrade most of commonly used electrolytes. The charge intermediates in oxygen evolution reaction (OER) attack the carbon electrode and electrolyte extensively. Even the discharge product, $Li_2O_2$, reacts with the carbon electrode and electrolyte upon physical contact.

Significant research efforts have been devoted to address this challenging instability issue. Carbon-free electrodes and protected carbon electrodes were proposed to avoid carbon degradation, while new solvents, salts and novel electrolyte systems were actively pursued to alleviate electrolyte decomposition. However, it is still difficult to eliminate by-products due to the high reactivity of the reaction intermediates and products. There have also been attempts to suppress side reactions by shifting ORR and OER reaction pathways to more stable ones using redox mediators, which eventually lead to a dual-mediator battery. The cycle life of the demonstrated dual-mediator $Li-O_2$ battery is still limited, and the limitation may be primarily attributed to positive electrode degradation by $Li_2CO_3$ resulting from chemical reactivity between the electrolyte and the reduced oxygen species. In addition, carbon positive electrode corrosion still exists, although it has been much mitigated compared with conventional $Li-O_2$ cells.

SUMMARY

In one aspect, the present disclosure provides an electrical cell comprising:
a negative electrode;
a positive electrode; and
a deposition layer separating the positive electrode and a gas phase that supplies at least one reactive gas;
wherein the deposition layer and the positive electrode are in communication with each other via electrolyte(s).

In some embodiments, the deposition layer disclosed herein is a structure having gas and liquid passages. The structure disclosed herein is capable of allowing liquids and gases to pass therethrough. In some embodiments, the deposition layer disclosed herein has a porous or mossy structure.

In some embodiments, the deposition layer disclosed herein is electrically non-conductive. In some embodiments, the deposition layer disclosed herein comprises or is consisting of at least one selected from the group consisting of silicon oxide, glass, cellulose, wool, down, polypropylene, polyethylene, polyvinylidene fluoride, polytetrafluoroethylene, polyvinyl chloride, acrylonitrile butadiene styrene, polyphenylene sulfide, polyether ether ketone, titanium oxide, aluminum oxide, and carbon.

In some embodiments, the deposition layer disclosed herein comprises an interconnected or non-interconnected fiber or particle.

In some embodiments, the deposition layer disclosed herein is optionally in direct contact with the positive electrode disclosed herein. In some embodiments, the deposition layer disclosed herein directly contacts with the positive electrode disclosed herein. In some embodiments, the deposition layer disclosed herein indirectly contacts with the positive electrode disclosed herein.

In some embodiments, the deposition layer and the positive electrode disclosed herein are each independently partially or wholly flooded with the electrolyte(s) disclosed herein. In some embodiments, the electrolyte which floods the deposition layer disclosed herein, is either the same or different from the electrolyte floods the positive electrode disclosed herein. In the event that the electrolyte which floods the deposition layer disclosed herein is different from the electrolyte floods the positive electrode disclosed herein, the two electrolytes are immiscible. In the event that the electrolyte which floods the deposition layer disclosed herein is the same as the electrolyte floods the positive electrode disclosed herein, the electrolyte disclosed herein is a catholyte.

In some embodiments, the negative electrode disclosed herein is in communication with an anolyte. In some embodiments, the negative electrode disclosed herein is partially or wholly flooded with the anolyte disclosed herein.

In some embodiments, the reactive gas disclosed herein comprises at least one selected from the group consisting of oxygen, carbon dioxide, sulfur dioxide, and nitrogen. In some embodiments, the reactive gas disclosed herein can react with compound(s) (e.g., compound(s) in reduced form) in the electrolyte(s) disclosed herein to form a solid, and the solid can react with compound(s) (e.g., compound(s) in oxidized form) in the electrolyte(s) disclosed herein to form the gas. In some embodiments, the compound(s) in reduced form disclosed herein is a reduced discharge mediator (rDM). In some embodiments, the compound(s) in oxidized form disclosed herein is an oxidized discharge mediator (oDM).

In some embodiments, the gas phase disclosed herein is any gas or gas mixture comprising or consisting of the reactive gas disclosed herein, such as air, exhaust gas, flue gas, etc.

In some embodiments, the negative electrode disclosed herein comprises at least one metal selected from the group consisting of lithium, sodium, potassium, magnesium, calcium, aluminum, vanadium, chromium, manganese, iron, cobalt, nickel, copper, and zinc, and is configured for electrochemical reduction and oxidation of the at least one metal disclosed herein, while the anolyte comprises a solution of at least one salt of the metals disclosed herein.

In some embodiments, the negative electrode disclosed herein comprises a conductive porous material and is configurated for electrochemical reduction and oxidation of the anolyte which comprises at least one compound capable of storing ions of the at least one metal disclosed herein, OH$^-$ or H$^+$ as an active material.

In some embodiments, the positive electrode disclosed herein comprises a conductive porous material and is configurated for electrochemical reduction and oxidation of the catholyte which comprises at least one compound capable of storing ions of the at least one metal disclosed herein, OH$^-$ or H$^+$ as an active material.

In some embodiments, the cell disclosed herein further comprises a separator separating the negative and positive electrodes disclosed herein.

In some embodiments, the separator disclosed herein allows the transfer of the at least one metal ion disclosed herein.

In some embodiments, the positive electrode and the deposition layer disclosed herein are each independently flat or curved.

In some embodiments, the anolyte disclosed herein is aqueous or nonaqueous.

In some embodiments, the catholyte disclosed herein is aqueous or nonaqueous.

In some embodiments, the concentration of the at least one compound capable of storing ions of the at least one metal disclosed herein which is comprised in the catholyte disclosed herein is about 1 mM to 10 M, 10 mM to 1 M, or 50 mM to 500 mM.

In some embodiments, the thickness of the deposition layer disclosed herein ranges from 1 μm to 10 cm, 1 μm to 1 cm, or 10 μm to 1 mm. In some embodiments, the porosity of the deposition layer disclosed herein ranges from 0.05 to 1.00, 0.1 to 1.00, 0.5 to 1.00, or 0.8 to 1.00.

In another aspect, the present disclosure provides a battery comprising the cell disclosed herein.

In some embodiments, the cell or battery disclosed herein is a metal-gas cell or battery. In some embodiments, the cell or battery disclosed herein is a dual-mediator cell or battery. In some more specific embodiments, the cell or battery disclosed herein is a dual-mediator meal-gas cell or battery.

In further another aspect, the present disclosure provides a battery comprising:

a cell comprising a negative electrode in communication with an anolyte and a positive electrode in communication with a catholyte; and a gas-liquid reactor, which is fed with the catholyte from the cell and a gas.

In some embodiments, the negative electrode and the positive electrode disclosed herein are separated by a separator.

In some embodiments, the negative electrode disclosed herein is partially or wholly flooded with the anolyte disclosed herein, and/or the positive electrode disclosed herein is partially or wholly flooded with the catholyte disclosed herein.

In some embodiments, the gas fed to the gas-liquid reactor disclosed herein comprises at least one selected from the group consisting of oxygen, carbon dioxide, sulfur dioxide, and nitrogen. In some embodiments, the gas fed to the gas-liquid reactor disclosed herein can react with compound(s) (e.g., compound(s) in reduced form) in the catholyte disclosed herein to form a solid, and the solid can react with compound(s) (e.g., compound(s) in oxidized form) in the catholyte disclosed herein to form the gas. In some embodiments, the compound(s) in reduced form disclosed herein is a reduced discharge mediator (rDM). In some embodiments, the compound(s) in oxidized form disclosed herein is an oxidized discharge mediator (oDM).

In some embodiments, the negative electrode disclosed herein comprises at least one metal selected from the group consisting of lithium, sodium, potassium, magnesium, calcium, aluminum, vanadium, chromium, manganese, iron, cobalt, nickel, copper, and zinc, and is configured for electrochemical reduction and oxidation of the at least one metal disclosed herein, while the anolyte comprises a solution of at least one salt of the metals disclosed herein.

In some embodiments, the negative electrode disclosed herein comprises a conductive porous material and is configurated for electrochemical reduction and oxidation of the anolyte which comprises at least one compound capable of storing ions of the at least one metal disclosed herein, OH$^-$ or H$^+$ as an active material.

In some embodiments, the positive electrode disclosed herein comprises a conductive porous material and is configurated for electrochemical reduction and oxidation of the catholyte which comprises at least one compound capable of storing ions of the at least one metal disclosed herein, OH$^-$ or H$^+$ as an active material.

In some embodiments, the anolyte disclosed herein is aqueous or nonaqueous.

In some embodiments, the catholyte disclosed herein is aqueous or nonaqueous.

In some embodiments, the catholyte disclosed herein is fed to the reactor disclosed herein in batches, and the gas disclosed herein is also fed to the reactor disclosed herein. In some embodiments, the fraction of catholyte fed to the reactor disclosed herein ranges from 1% to 100%, 50% to 100%, or 70 to 100%, and the rest of catholyte is combined with the effluent of the reactor disclosed herein in a container. In some embodiments, the rest of catholyte is evenly mixed with the effluent of the reactor disclosed herein in the container. In some embodiments, the effluent from the container is optionally directly fed back to the cell disclosed herein. In some embodiments, a storage tank is optionally provided between the container and the cell disclosed herein to store the effluent from the container to be fed back to the cell disclosed herein.

In some embodiments, the effluent of the reactor disclosed herein is processed in a process comprising at least one selected from the group consisting of heating, pressure reduction, and even mixture with a gas comprising at least one selected from the group consisting of oxygen, carbon dioxide, sulfur dioxide, and nitrogen in the container.

In some embodiments, the catholyte disclosed herein is fed to the reactor disclosed herein in batches, and the gas disclosed herein is also fed to the reactor disclosed herein. In some embodiments, the feeding amount of the gas to the gas-liquid reactor disclosed herein is regulated according to the feeding amount of active material in the form of the catholyte disclosed herein such that the gas is reacted completely or at least almost completely. In some embodiments, the feeding amount of the active material in the form of the catholyte disclosed herein can be determined by discharge current. In some embodiments, the feeding amount of the gas can be controlled by a flow controller.

In some embodiments, the catholyte disclosed herein is fed to the reactor disclosed herein continuously, and the gas disclosed herein is also fed to the reactor disclosed herein. In some embodiments, the feeding rate of the gas to the gas-liquid reactor disclosed herein is regulated according to the feeding rate of active material in the form of the catholyte disclosed herein such that the gas is reacted completely or at least almost completely. In some embodiments, the feeding rate of the active material in the form of the catholyte disclosed herein can be determined by discharge current. In some embodiments, the feeding rate of the gas can be controlled by a flow controller.

In still another aspect, the present disclosure provides a method for manufacturing an electrical cell comprising:

providing a negative electrode and a positive electrode;

providing a deposition layer to separate the positive electrode and a gas phase that supplies at least one reactive gas, wherein the deposition layer and the positive electrode are in communication with each other via electrolyte(s).

In some embodiments, where the maximum mass transfer flux of the reactive gas to the positive electrode is larger than or equals to that of compound(s) (e.g., compound(s) in reduced form) in the electrolyte(s) disclosed herein, which can react with the reactive gas to form a solid, the partial pressure of the reactive gas, the electrolyte(s) and/or the deposition layer is selected according to a requirement which contributes to the flux of the compound(s) (e.g., compound(s) in reduced form) in the electrolyte(s) disclosed herein and/or hinders the flux of the reactive gas disclosed herein. In some embodiments, where the maximum mass transfer flux of the reactive gas to the positive electrode is larger than or equals to that of the compound(s) (e.g., compound(s) in reduced form) in the electrolyte(s) disclosed herein, which can react with the reactive gas to form a solid, the thickness and/or porosity of the deposition layer is selected according to the requirement which contributes to the flux of the compound(s) (e.g., compound(s) in reduced form) in the electrolyte(s) disclosed herein and/or hinders the flux of the reactive gas disclosed herein.

In another aspect, the present disclosure provides an electrical cell made according to the method disclosed herein and a battery comprising an electrical cell made according to the method disclosed herein.

In yet another aspect, the present disclosure provides a method for improving the performances of a cell or battery comprising a negative electrode, a positive electrode, and a deposition layer separating the positive electrode and a gas phase that supplies at least one reactive gas, wherein the deposition layer and the positive electrode are in communication with each other via electrolyte(s), the method disclosed herein comprising:

controlling reaction fronts away from the positive electrode disclosed herein by tuning the flux of compound(s) (e.g., compound(s) in reduced form) in the electrolyte(s) disclosed herein, which can react with the reactive gas to form a solid, and/or the flux of the reactive gas disclosed herein.

In some embodiments, the fluxes of the compound(s) (e.g., compound(s) in reduced form) in the electrolyte(s) disclosed herein and the reactive gas disclosed herein are tuned via selection of the electrolyte(s), the structure of the deposition layer, and operational parameters.

In some embodiments, the reaction fronts is controlled away from the positive electrode by selecting at least one of the following parameters: the partial pressure of the reactive gas; discharge current; concentration of compound(s) (including compound(s) in reduced form or compound(s) in oxidized form) in the electrolyte(s) disclosed herein; the thickness or porosity of the deposition layer; or the solubility or diffusion coefficient of the reactive gas or the compound(s) (e.g., compound(s) in reduced form) in the electrolyte(s) disclosed herein, which can react with the reactive gas to form a solid, etc.

In some embodiments, the thickness of the deposition layer ranges from 1 μm to 10 cm, or 1 μm to 1 cm, or 10 μm to 1 mm. In some embodiments, the porosity of the deposition layer ranges from 0.05 to 1.00, or 0.1 to 1.00, or 0.5 to 1.00, or 0.8 to 1.00.

In some embodiments, where the maximum mass transfer flux of the reactive gas to the positive electrode is larger than or equals to that of the compound(s) (e.g., compound(s) in reduced form) in the electrolyte(s) disclosed herein, which can react with the reactive gas to form a solid, the method disclosed herein comprises selecting the parameters disclosed herein to contribute to the flux of the compound(s) (e.g., compound(s) in reduced form) in the electrolyte(s) disclosed herein, which can react with the reactive gas to form a solid, and/or hinders the flux of the reactive gas disclosed herein.

In some embodiments, the cell or battery in the method disclosed herein is a metal-gas cell or battery. In some embodiments, the cell or battery in the method disclosed herein is a dual-mediator cell or battery. In some more specific embodiments, the cell or battery in the method disclosed herein is a dual-mediator meal-gas cell or battery.

In some embodiments, the deposition layer in the method disclosed herein is a structure having gas and liquid passages. The structure disclosed herein is capable of allowing liquids and gases to pass therethrough. In some embodiments, the deposition layer disclosed herein has a porous or mossy structure.

In some embodiments, the deposition layer in the method disclosed herein is electrically non-conductive. In some embodiments, the deposition layer in the method disclosed herein comprises or is consisting of at least one selected from the group consisting of silicon oxide, glass, cellulose, wool, down, polypropylene, polyethylene, polyvinylidene fluoride, polytetrafluoroethylene, polyvinyl chloride, acrylonitrile butadiene styrene, polyphenylene sulfide, polyether ether ketone, titanium oxide, aluminum oxide, and carbon.

In some embodiments, the deposition layer in the method disclosed herein comprises an interconnected or non-interconnected fiber or particle.

In some embodiments, the deposition layer in the method disclosed herein is optionally in direct contact with the positive electrode disclosed herein. In some embodiments, the deposition layer disclosed herein directly contacts with the positive electrode disclosed herein. In some embodiments, the deposition layer disclosed herein indirectly contacts with the positive electrode disclosed herein.

In some embodiments, the deposition layer and the positive electrode in the method disclosed herein are each independently partially or wholly flooded with the electrolyte(s) disclosed herein. In some embodiments, the electrolyte which floods the deposition layer disclosed herein, is either the same or different from the electrolyte floods the positive electrode disclosed herein. In the event that the electrolyte which floods the deposition layer disclosed herein is different from the electrolyte floods the positive electrode disclosed herein, the two electrolytes are immiscible. In the event that the electrolyte which floods the deposition layer disclosed herein is the same as the electrolyte floods the positive electrode disclosed herein, the electrolyte disclosed herein is a catholyte.

In some embodiments, the negative electrode in the method disclosed herein is in communication with an anolyte. In some embodiments, the negative electrode in the method disclosed herein is partially or wholly flooded with the anolyte disclosed herein.

In some embodiments, the reactive gas in the method disclosed herein comprises at least one selected from the group consisting of oxygen, carbon dioxide, sulfur dioxide, and nitrogen. In some embodiments, the reactive gas disclosed herein can react with compound(s) (e.g., the compound(s) in reduced form) in the electrolyte(s) disclosed herein to form a solid, and the solid can react with compound(s) (e.g., the compound(s) in oxidized form) in the electrolyte(s) disclosed herein to form the gas. In some embodiments, the compound(s) in reduced form disclosed herein is a reduced discharge mediator (rDM). In some embodiments, the compound(s) in oxidized form disclosed herein is an oxidized discharge mediator (oDM).

In some embodiments, the gas phase in the method disclosed herein is any gas or gas mixture comprising or consisting of the reactive gas disclosed herein, such as air, exhaust gas, flue gas, etc.

In some embodiments, the negative electrode in the method disclosed herein comprises at least one metal selected from the group consisting of lithium, sodium, potassium, magnesium, calcium, aluminum, vanadium, chromium, manganese, iron, cobalt, nickel, copper, and zinc, and is configured for electrochemical reduction and oxidation of the at least one metal disclosed herein, while the anolyte comprises a solution of at least one salt of the metals disclosed herein.

In some embodiments, the negative electrode in the method disclosed herein comprises a conductive porous material and is configured for electrochemical reduction and oxidation of the anolyte which comprises at least one compound capable of storing ions of the at least one metal disclosed herein, $OH^-$ or $H^+$ as an active material.

In some embodiments, the positive electrode in the method disclosed herein comprises a conductive porous material and is configured for electrochemical reduction and oxidation of the catholyte which comprises at least one compound capable of storing ions of the at least one metal disclosed herein, $OH^-$ or $H^+$ as an active material.

In some embodiments, the cell in the method disclosed herein further comprises a separator separating the negative and positive electrodes disclosed herein.

In some embodiments, the separator disclosed herein allows the transfer of the at least one metal ion disclosed herein.

In some embodiments, the positive electrode and the deposition layer in the method disclosed herein are each independently flat or curved.

In some embodiments, the anolyte in the method disclosed herein is aqueous or nonaqueous.

In some embodiments, the catholyte in the method disclosed herein is aqueous or nonaqueous.

In some embodiments, the concentration of the at least one compound capable of storing ions of the at least one metal disclosed herein which is comprised in the catholyte disclosed herein is about 1 mM to 10 M, 10 mM to 1 M, or 50 mM to 500 mM.

BRIEF DESCRIPTION OF THE DRAWINGS

FIG. 1$a$, 1$b$ and 1$c$ are the working principles of the ORR reaction in a conventional cell (a), a conventional dual-mediator cell (b) and a protected dual-mediator cell (c), respectively. oDM and rDM are short for discharge mediator in its oxidized and reduced forms, respectively. ORR is short for oxygen reduction reaction.

FIG. 3$a$ shows the operation conditions of the Non-Protected and Protected cells. FIG. 3$b$ shows the amount of $Li_2O_2$ in the positive electrodes and deposition layers as determined by $TiOSO_4$ assay after discharge to 1 mAh.

FIG. 5$a$: Photographs of pristine electrode. FIG. 5$b$: Non-protected discharged electrode. FIG. 5$c$: Protected discharge electrode. FIG. 5$d$-5$f$: SEM images of the carbon fibres in the positive electrodes. FIG. 5$g$-5$i$: SEM images of the quartz fibres in the deposition layers. Lower panels in FIG. 5$d$-5$i$ are high resolution images of the marked area in the corresponding upper panels.

FIG. 9$a$-9$b$: the pressure reduction during discharge at 250 µA. FIG. 9$c$-9$d$: gas evolution during charge at 500 µA.

FIG. 12a: FTIR spectra of the positive electrodes and references. FIG. 12b: quantification of by-products deposited in the positive electrode and the deposition layer. By-products are transformed into $CO_2$ using Fenton's reagent and then quantified using OEMS.

FIG. 13a: galvanostatic voltage profiles of the Non-protected cell. FIG. 13b: galvanostatic voltage profiles of the Protected cell. The $2^{nd}$ cycle after replacing the lithium negative electrode is overlaid for comparison. Both cells are subjected to galvanostatic cycling at 250 μA discharge current and 500 μA charge current with a 1 mAh capacity cut-off. Each charge is followed by a discharge at 250 μA to 3 V and hold for 1 h or until current drops below 10 μA to reduce oxidized TEMPO. FIG. 13c: evolution of the Protected cell discharge capacity with cycling.

FIG. 14a: a schematic of the positive electrode structure used for modelling study. FIG. 14b: effect of cell parameters on the effectiveness of positive electrode protection, which is defined by the amount of $Li_2O_2$ deposited on the positive electrode per discharge (vertical axis). The x axis denotes the changes in the indicated parameter with respect to its original value (Protected cell). FIG. 14c-14k: simulated concentration profiles of $O_2$, DBBQLi and $Li_2O_2$ in the Non-protected and Protected cells during discharge at 250 μA to 1 mAh. Depth of 0-0.45 mm represents the deposition layer and 0.45-0.55 mm represents the positive electrode. Discharge current starts at 0 min and terminates at 240 min. More detailed aspects including simulated profiles of DBBQ concentration and $O_2$ consumption in the two cells can be found in FIG. 10.

DETAILED DESCRIPTIONS

Definitions

Figure 1:
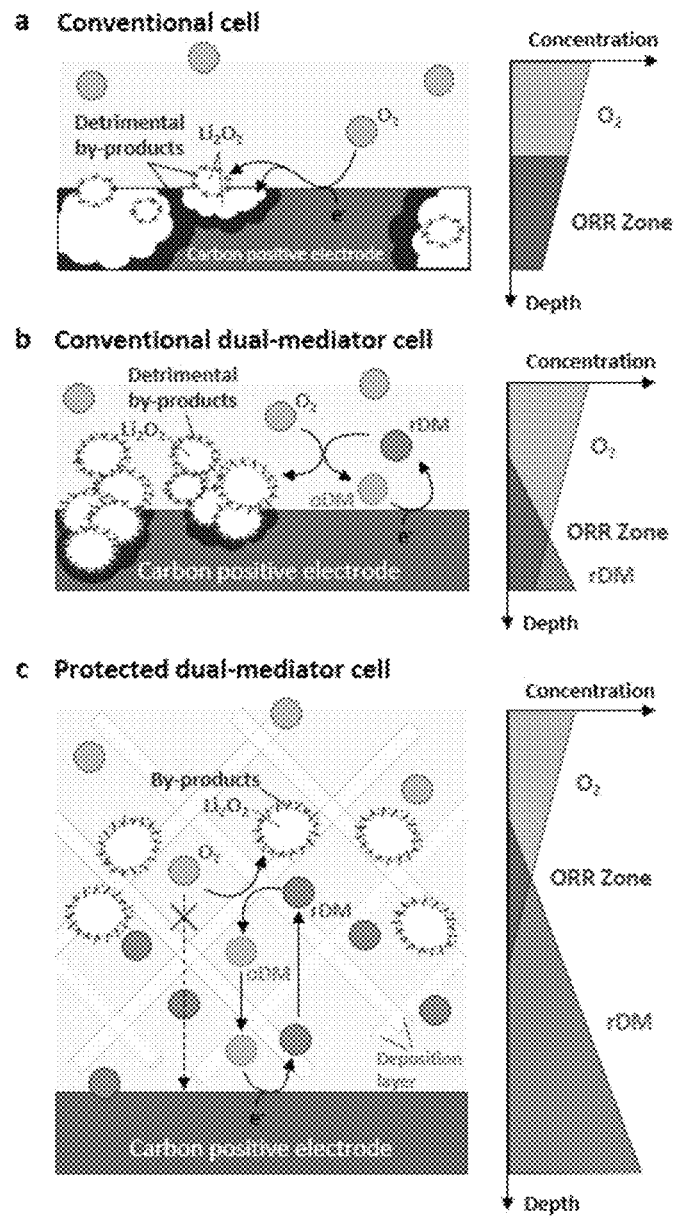
FIG. 1 is a schematic of the working principle of the cells of the present disclosure and the conventional cells.

Unless stated otherwise, the terms and phrases used herein have the following meanings. A specific term or phrase shall not be considered as indefinite or unclear when it is not specifically defined, but should be understood according to the general meaning thereof.

The term "optionally" means that the subsequently described event(s) may or may not occur, and comprises both event(s), which occur, and events that do not occur.

Whenever a numerical range is indicated herein, it is meant to include the endpoints thereof and all the individual integers and fractions within the range, and also include each of the narrower ranges therein formed by all the various possible combinations of those endpoints and internal integers and fractions to form subgroups of the larger group of values within the stated range to the same extent as if each of those narrower ranges was explicitly recited. For example, the concentration of "about 1 mM to 10 M" means that the concentration may be 1 mM, 1.1 mM, 1.2 mM, 2 mM, 10 mM, 100 mM, 1 M, 2 M, 5 M, 10M etc.

Detailed Descriptions of Embodiments

In one aspect, the present disclosure provides an electrical cell comprising:
    a negative electrode;
    a positive electrode; and
    a deposition layer separating the positive electrode and a gas phase that supplies at least one reactive gas;
    wherein the deposition layer and the positive electrode are in communication with each other via electrolyte(s).

In the electrical cell disclosed herein, a structure having gas and liquid passages may be used as the deposition layer disclosed herein. The structure disclosed herein is capable of allowing liquids and gases to pass therethrough. In some embodiments, the deposition layer disclosed herein has a porous structure or a mossy structure.

In some embodiments, the deposition layer disclosed herein is electrically non-conductive. In some embodiments, the deposition layer disclosed herein comprises or is consisting of at least one selected from the group consisting of silicon oxide, glass, cellulose, wool, down, polypropylene, polyethylene, polyvinylidene fluoride, polytetrafluoroethylene, polyvinyl chloride, acrylonitrile butadiene styrene, polyphenylene sulfide, polyether ether ketone, titanium oxide, aluminum oxide, and carbon.

In some embodiments, the deposition layer disclosed herein comprises an interconnected or non-interconnected fiber or particle. One of the functions of the deposition layer disclosed herein is to support a solid product, for example, a discharge product (such as $Li_2O_2$, LiOH, $LiOH.H_2O$, $Li_2CO_3$, $Li_2S_2O_4$, $Li_3N$, $Na_2O_2$, $NaO_2$, $Na_2CO_3$, $K_2O_2$, $KO_2$, $K_2CO_3$, MgO, CaO, $Al_2O_3$, $MnO_2$, $Fe_2O_3$, ZnO, etc) and other by-products formed in the electrolyte(s).

In some embodiments, the deposition layer disclosed herein is optionally in direct contact with the positive electrode disclosed herein. In some embodiments, the deposition layer disclosed herein directly contacts with the positive electrode. In some embodiments, the deposition layer disclosed herein indirectly contacts with the positive electrode disclosed herein.

In some embodiments, the deposition layer and the positive electrode disclosed herein are each independently partially or wholly flooded with the electrolyte(s) disclosed herein. In some embodiments, the electrolyte which floods the deposition layer disclosed herein, is either the same or different from the electrolyte floods the positive electrode disclosed herein. In the event that the electrolyte which floods the deposition layer disclosed herein is different from the electrolyte floods the positive electrode disclosed herein, the two electrolytes are immiscible. In the event that the electrolyte which floods the deposition layer disclosed herein is the same as the electrolyte floods the positive electrode disclosed herein, the electrolyte disclosed herein is a catholyte.

In some embodiments, the negative electrode disclosed herein is in communication with an anolyte. In some embodiments, the negative electrode disclosed herein is partially or wholly flooded with the anolyte disclosed herein.

In some embodiments, the reactive gas disclosed herein comprises at least one selected from the group consisting of oxygen, carbon dioxide, sulfur dioxide, and nitrogen. In some embodiments, the reactive gas disclosed herein can react with compound(s) (e.g., compound(s) in reduced form such as a reduced discharge mediator rDM) in the electrolyte(s) disclosed herein to form a solid (e.g., a discharge product such as $Li_2O_2$, LiOH, $LiOH.H_2O$, $Li_2CO_3$, $Li_2S_2O_4$, $Li_3N$, $Na_2O_2$, $NaO_2$, $Na_2CO_3$, $K_2O_2$, $KO_2$, $K_2CO_3$, MgO, CaO, $Al_2O_3$, $MnO_2$, $Fe_2O_3$, ZnO, etc), and the solid can react with compound(s) (e.g., compound(s) in oxidized form such as an oxidized discharge mediator oDM) in the electrolyte(s) disclosed herein to form the gas. The gas should be identical to the discharge reactant. For example, $O_2$ is discharged to form the solid $Li_2O_2$, which then transforms back to $O_2$ upon charging.

In some embodiments, the gas phase disclosed herein is any gas or gas mixture comprising or consisting of the reactive gas disclosed herein, such as air, exhaust gas, flue gas, etc.

In some embodiments, the negative electrode disclosed herein comprises at least one metal selected from the group consisting of lithium, sodium, potassium, magnesium, calcium, aluminum, vanadium, chromium, manganese, iron, cobalt, nickel, copper, and zinc, and is configured for electrochemical reduction and oxidation of the at least one metal disclosed herein, while the anolyte comprises a solution of at least one salt of the metals disclosed herein.

In some embodiments, the negative electrode disclosed herein comprises a conductive porous material and is configurated for electrochemical reduction and oxidation of the anolyte which comprises at least one compound capable of storing ions of the at least one metal disclosed herein, OH⁻ or H⁺ as an active material.

In some embodiments, the positive electrode disclosed herein comprises a conductive porous material and is configurated for electrochemical reduction and oxidation of the catholyte which comprises at least one compound capable of storing ions of the at least one metal disclosed herein, OH⁻ or H⁺ as an active material.

In some embodiments, the cell disclosed herein further comprises a separator separating the negative and positive electrodes disclosed herein.

In some embodiments, the separator disclosed herein allows the transfer of the at least one metal ion disclosed herein.

In some embodiments, the positive electrode and the deposition layer disclosed herein are each independently flat or curved.

In some embodiments, the anolyte disclosed herein is aqueous or nonaqueous.

In some embodiments, the catholyte disclosed herein is aqueous or nonaqueous.

In some embodiments, the concentration of the at least one compound capable of storing ions of the at least one metal disclosed herein which is comprised in the catholyte disclosed herein is about 1 mM to 10 M (e.g., 1 mM, 1.1 mM, 1.2 mM, 2 mM, 10 mM, 100 mM, 500 mM, 1 M, 2 M, 5 M, 10M, etc.), 10 mM to 1 M, or 50 mM to 500 mM.

In some embodiments, the thickness of the deposition layer disclosed herein ranges from 1 μm to 10 cm (e.g., 1 μm, 5 μm, 8 μm, 10 μm, 20 μm, 50 μm, 100 μm, 200 μm, 500 μm, 800 μm, 1 mm, 2 mm, 5 mm, 1 cm, 2 cm, 5 cm, 8 cm, 10 cm, etc.), or 1 μm to 1 cm, or 10 μm to 1 mm. In some embodiments, the porosity of the deposition layer disclosed herein ranges from 0.05 to 1.00 (e.g., 0.05, 0.08, 0.1, 0.2, 0.3, 0.4, 0.5, 0.6, 0.7, 0.8, 0.9, 1.00), or 0.1 to 1.00, or 0.5 to 1.00, or 0.8 to 1.00.

In another aspect, the present disclosure provides a battery comprising the cell disclosed herein.

In some embodiments, the cell or battery disclosed herein is a metal-gas cell or battery. In some embodiments, the cell or battery disclosed herein is a dual-mediator cell or battery. In some more specific embodiments, the cell or battery disclosed herein is a dual-mediator meal-gas cell or battery.

In further another aspect, the present disclosure provides a battery comprising:

a cell comprising a negative electrode in communication with an anolyte and a positive electrode in communication with a catholyte; and a gas-liquid reactor, which is fed with the catholyte from the cell and a gas.

In some embodiments, the negative electrode and the positive electrode disclosed herein are separated by a separator.

In some embodiments, the negative electrode disclosed herein is partially or wholly flooded with the anolyte disclosed herein, and/or the positive electrode disclosed herein is partially or wholly flooded with the catholyte disclosed herein.

In some embodiments, the gas fed to the gas-liquid reactor disclosed herein comprises at least one selected from the group consisting of oxygen, carbon dioxide, sulfur dioxide, and nitrogen. In some embodiments, the gas fed to the gas-liquid reactor disclosed herein can react with compound(s) (e.g., compound(s) in reduced form such as rDM) in the catholyte disclosed herein to form a solid (e.g., a discharge product such as $Li_2O_2$, LiOH, $LiOH.H_2O$, $Li_2CO_3$, $Li_2S_2O_4$, $Li_3N$, $Na_2O_2$, $NaO_2$, $Na_2CO_3$, $K_2O_2$, $KO_2$, $K_2CO_3$, MgO, CaO, $Al_2O_3$, $MnO_2$, $Fe_2O_3$, ZnO, etc.), and the solid can react with compound(s) (e.g., compound(s) in oxidized form such as oDM) in the catholyte disclosed herein to form the gas. The gas should be identical to the discharge reactant. For example, $O_2$ is discharged to form the solid $Li_2O_2$, which then transforms back to $O_2$ upon charging.

In some embodiments, the negative electrode disclosed herein comprises at least one metal selected from the group consisting of lithium, sodium, potassium, magnesium, calcium, aluminum, vanadium, chromium, manganese, iron, cobalt, nickel, copper, and zinc, and is configured for electrochemical reduction and oxidation of the at least one metal disclosed herein, while the anolyte comprises a solution of at least one salt of the metals disclosed herein.

In some embodiments, the negative electrode disclosed herein comprises a conductive porous material and is configurated for electrochemical reduction and oxidation of the anolyte which comprises at least one compound capable of storing ions of the at least one metal disclosed herein, $OH^-$ or $H^+$ as an active material.

In some embodiments, the positive electrode disclosed herein comprises a conductive porous material and is configurated for electrochemical reduction and oxidation of the catholyte which comprises at least one compound capable of storing ions of the at least one metal disclosed herein, $OH^-$ or $H^+$ as an active material.

In some embodiments, the anolyte disclosed herein is aqueous or nonaqueous.

In some embodiments, the catholyte disclosed herein is aqueous or nonaqueous.

In some embodiments, the catholyte disclosed herein is fed to the reactor disclosed herein in batches, and the gas disclosed herein is also fed to the reactor disclosed herein. In some embodiments, the fraction of catholyte fed to the reactor disclosed herein ranges from 1% to 100% (e.g., 1%, 5%, 10%, 20%, 30%, 40%, 50%, 60%, 70%, 80%, 90%, 100%, etc.), 50% to 100%, or 70 to 100%, and the rest of catholyte is combined with the effluent of the reactor disclosed herein in a container. In some embodiments, the rest of catholyte is evenly mixed with the effluent of the reactor disclosed herein in the container. In some embodiments, the effluent from the container is optionally directly fed back to the cell disclosed herein. In some embodiments, a storage tank is optionally provided between the container and the cell disclosed herein to store the effluent from the container to be fed back to the cell disclosed herein.

In some embodiments, the effluent of the reactor disclosed herein is processed in a process comprising at least one selected from the group consisting of heating, pressure reduction, and even mixture with a gas comprising at least one selected from the group consisting of oxygen, carbon dioxide, sulfur dioxide, and nitrogen in the container.

In some embodiments, the catholyte disclosed herein is fed to the reactor disclosed herein in batches, and the gas disclosed herein is also fed to the reactor disclosed herein. In some embodiments, the feeding amount of the gas to the gas-liquid reactor disclosed herein is regulated according to the feeding amount of active material in the form of the catholyte disclosed herein such that the gas is reacted completely or at least almost completely. In some embodiments, the feeding amount of the active material in the form of the catholyte disclosed herein can be determined by discharge current. In some embodiments, the feeding amount of the gas can be controlled by a flow controller.

In some embodiments, the catholyte disclosed herein is fed to the reactor disclosed herein continuously, and the gas disclosed herein is also fed to the reactor disclosed herein. In some embodiments, the feeding rate of the gas to the gas-liquid reactor disclosed herein is regulated according to the feeding rate of active material in the form of the catholyte disclosed herein such that the gas is reacted completely or at least almost completely. In some embodiments, the feeding rate of the active material in the form of the catholyte disclosed herein can be determined by discharge current. In some embodiments, the feeding rate of the gas can be controlled by a flow controller.

In still another aspect, the present disclosure provides a method for manufacturing an electrical cell comprising:
providing a negative electrode and a positive electrode;
providing a deposition layer to separate the positive electrode and a gas phase that supplies at least one reactive gas, wherein the deposition layer and the positive electrode are in communication with each other via electrolyte(s).

In some embodiments, where the maximum mass transfer flux of the reactive gas to the positive electrode is larger than or equals to that of compound(s) (e.g., compound(s) in reduced form such as rDM) in the electrolyte(s) disclosed herein, which can react with the reactive gas to form a solid, the partial pressure of the reactive gas, the electrolyte(s) and/or the deposition layer is selected according to a requirement which contributes to the flux of the compound(s) (e.g., compound(s) in reduced form such as rDM) in the electrolyte(s) disclosed herein, and/or hinders the flux of the reactive gas disclosed herein. In some more specific embodiments, where the maximum mass transfer flux of the reactive gas to the positive electrode is larger than or equals to that of the compound(s) (e.g., compound(s) in reduced form such as rDM) in the electrolyte(s) disclosed herein, which can react with the reactive gas to form a solid, the thickness and/or porosity of the deposition layer is selected according to the requirement which contributes to the flux of the compound(s) (e.g., compound(s) in reduced form such as rDM) in the electrolyte(s) disclosed herein, and/or hinders the flux of the reactive gas disclosed herein.

In the manufacture method disclosed herein, a structure having gas and liquid passages may be used as the deposition layer disclosed herein. The structure disclosed herein is capable of allowing liquids and gases to pass therethrough. In some embodiments, the deposition layer disclosed herein has a porous structure or a mossy structure.

In some embodiments, the deposition layer in the manufacture method disclosed herein is electrically non-conductive. In some embodiments, the deposition layer in the manufacture method disclosed herein comprises or is consisting of at least one selected from the group consisting of silicon oxide, glass, cellulose, wool, down, polypropylene, polyethylene, polyvinylidene fluoride, polytetrafluoroethylene, polyvinyl chloride, acrylonitrile butadiene styrene, polyphenylene sulfide, polyether ether ketone, titanium oxide, aluminum oxide, and carbon.

In some embodiments, the deposition layer in the manufacture method disclosed herein comprises an interconnected or non-interconnected fiber or particle.

In some embodiments, the deposition layer in the manufacture method disclosed herein is optionally in direct contact with the positive electrode disclosed herein. In some embodiments, the deposition layer in the manufacture method disclosed herein directly contacts with the positive electrode. In some embodiments, the deposition layer in the manufacture method disclosed herein indirectly contacts with the positive electrode disclosed herein.

In some embodiments, the deposition layer and the positive electrode in the manufacture method disclosed herein are each independently partially or wholly flooded with the electrolyte(s) disclosed herein. In some embodiments, the electrolyte which floods the deposition layer disclosed herein, is either the same or different from the electrolyte floods the positive electrode disclosed herein. In the event that the electrolyte which floods the deposition layer disclosed herein is different from the electrolyte floods the positive electrode disclosed herein, the two electrolytes are immiscible. In the event that the electrolyte which floods the deposition layer disclosed herein is the same as the electrolyte floods the positive electrode disclosed herein, the electrolyte disclosed herein is a catholyte.

In some embodiments, the negative electrode in the manufacture method disclosed herein is in communication with an anolyte. In some embodiments, the negative electrode in the manufacture method disclosed herein is partially or wholly flooded with the anolyte disclosed herein.

In some embodiments, the reactive gas in the manufacture method disclosed herein comprises at least one selected from the group consisting of oxygen, carbon dioxide, sulfur dioxide, and nitrogen. In some embodiments, the reactive gas disclosed herein can react with compound(s) (e.g., compound(s) in reduced form such as a reduced discharge mediator rDM) in the electrolyte(s) disclosed herein to form a solid, and the solid can react with compound(s) (e.g., compound(s) in oxidized form such as an oxidized discharge mediator oDM) in the electrolyte(s) disclosed herein to form the gas. The gas should be identical to the discharge reactant. For example, $O_2$ is discharged to form the solid $Li_2O_2$, which then transforms back to $O_2$ upon charging.

In some embodiments, the gas phase in the manufacture method disclosed herein is any gas or gas mixture comprising or consisting of the reactive gas disclosed herein, such as air, exhaust gas, flue gas, etc.

In some embodiments, the negative electrode in the manufacture method disclosed herein comprises at least one metal selected from the group consisting of lithium, sodium, potassium, magnesium, calcium, aluminum, vanadium, chromium, manganese, iron, cobalt, nickel, copper, and zinc, and is configured for electrochemical reduction and oxidation of the at least one metal disclosed herein, while the anolyte comprises a solution of at least one salt of the metals disclosed herein.

In some embodiments, the negative electrode in the manufacture method disclosed herein comprises a conductive porous material and is configured for electrochemical reduction and oxidation of the anolyte which comprises at least one compound capable of storing ions of the at least one metal disclosed herein, $OH^-$ or $H^+$ as an active material.

In some embodiments, the positive electrode in the manufacture method disclosed herein comprises a conductive porous material and is configured for electrochemical reduction and oxidation of the catholyte which comprises at least one compound capable of storing ions of the at least one metal disclosed herein, $OH^-$ or $H^+$ as an active material.

In some embodiments, the manufacture method disclosed herein further comprises providing a separator separating the negative and positive electrodes disclosed herein. In some embodiments, the separator disclosed herein allows the transfer of the at least one metal ion disclosed herein.

In some embodiments, the positive electrode and the deposition layer in the manufacture method disclosed herein are each independently flat or curved.

In some embodiments, the anolyte in the manufacture method disclosed herein is aqueous or nonaqueous.

In some embodiments, the catholyte in the manufacture method disclosed herein is aqueous or nonaqueous.

In some embodiments, the concentration of the at least one compound capable of storing ions of the at least one metal disclosed herein which is comprised in the catholyte disclosed herein is about 1 mM to 10 M, 10 mM to 1 M, or 50 mM to 500 mM.

In some embodiments, the thickness of the deposition layer in the manufacture method disclosed herein ranges from 1 µm to 10 cm, or 1 µm to 1 cm, or 10 µm to 1 mm. In some embodiments, the porosity of the deposition layer in the manufacture method disclosed herein ranges from 0.05 to 1.00, or 0.1 to 1.00, or 0.5 to 1.00, or 0.8 to 1.00.

In another aspect, the present disclosure provides an electrical cell made according to the manufacture method disclosed herein and a battery comprising an electrical cell made according to the manufacture method disclosed herein.

In yet another aspect, the present disclosure provides a method for improving the performances of a cell or battery comprising a negative electrode, a positive electrode, and a deposition layer separating the positive electrode and a gas phase that supplies at least one reactive gas, wherein the deposition layer and the positive electrode are in communication with each other via electrolyte(s), the method disclosed herein comprising:

controlling reaction fronts away from the positive electrode disclosed herein by tuning the flux of compounds (e.g., compound(s) in reduced form such as rDM) in the electrolyte(s) disclosed herein, which can react with the reactive gas to form a solid, and/or the flux of the reactive gas disclosed herein.

In some embodiments, the fluxes of the compounds (e.g., compound(s) in reduced form such as rDM) in the electrolyte(s) disclosed herein and the reactive gas disclosed herein are tuned via selection of electrolyte(s), such as solubilities and diffusion coefficients of the reactive gas and the compound(s) (e.g., compound(s) in reduced form such as rDM) in the electrolyte(s), which can react with the reactive gas to form a solid, etc.; structure of the deposition layer (such as thickness, porosity, etc.); and operational parameters (such as the current density of discharge current, the partial pressure of the reactive gas, the concentration of compound (s) (e.g., the compound(s) in reduced form such as rDM or compound(s) in oxidized form such as oDM) in the electrolyte(s) disclosed herein, etc.).

In some embodiments, the reaction fronts is controlled away from the positive electrode by selecting at least one of the following parameters: the partial pressure of the reactive gas; discharge current; concentration of the compound(s) (e.g., the compound(s) in reduced form such as rDM or compound(s) in oxidized form such as oDM) in the electrolyte(s) disclosed herein; thickness or porosity of the deposition layer; or solubilities or diffusion coefficients of the reactive gas or compounds (e.g., the compound(s) in reduced form such as rDM) in the electrolyte(s), which can react with the reactive gas to form a solid, etc.

In some embodiments, the thickness of the deposition layer disclosed herein ranges from 1 µm to 10 cm (e.g., 1 µm, 5 µm, 8 µm, 10 µm, 20 µm, 50 µm, 100 µm, 200 µm, 500 µm, 800 µm, 1 mm, 2 mm, 5 mm, 1 cm, 2 cm, 5 cm, 8 cm, 10 cm, etc.), or 1 µm to 1 cm, or 10 µm to 1 mm. In some embodiments, the porosity of the deposition layer disclosed herein ranges from 0.05 to 1.00 (e.g., 0.05, 0.08, 0.1, 0.2, 0.3, 0.4, 0.5, 0.6, 0.7, 0.8, 0.9, 1.00), or 0.1 to 1.00, or 0.5 to 1.00, or 0.8 to 1.00.

In some embodiments, where the maximum mass transfer flux of the reactive gas to the positive electrode is larger than or equals to that of the compound(s) (e.g., compound(s) in reduced form such as rDM) in the electrolyte(s) disclosed herein, which can react with the reactive gas to form a solid, the method disclosed herein comprises selecting the parameters disclosed herein to contribute to the flux of the compound(s) (e.g., compound(s) in reduced form such as rDM) in the electrolyte(s) disclosed herein, and/or hinders the flux of the reactive gas disclosed herein.

In some embodiments, the cell or battery in the method disclosed herein is a metal-gas cell or battery. In some embodiments, the cell or battery in the method disclosed herein is a dual-mediator cell or battery. In some more specific embodiments, the cell or battery in the method disclosed herein is a dual-mediator meal-gas cell or battery.

In some embodiments, the deposition layer in the method disclosed herein is a structure having gas and liquid passages. The structure disclosed herein is capable of allowing liquids and gases to pass therethrough. In some embodiments, the deposition layer disclosed herein has a porous or mossy structure.

In some embodiments, the deposition layer in the method disclosed herein is electrically non-conductive. In some embodiments, the deposition layer in the method disclosed herein comprises or is consisting of at least one selected from the group consisting of silicon oxide, glass, cellulose, wool, down, polypropylene, polyethylene, polyvinylidene fluoride, polytetrafluoroethylene, polyvinyl chloride, acrylonitrile butadiene styrene, polyphenylene sulfide, polyether ether ketone, titanium oxide, aluminum oxide, and carbon.

In some embodiments, the deposition layer in the method disclosed herein comprises an interconnected or non-interconnected fiber or particle.

In some embodiments, the deposition layer in the method disclosed herein is optionally in direct contact with the positive electrode. In some embodiments, the deposition layer disclosed herein directly contacts with the positive electrode. In some embodiments, the deposition layer disclosed herein indirectly contacts with the positive electrode.

In some embodiments, the deposition layer and the positive electrode in the method disclosed herein are each independently partially or wholly flooded with the electrolyte(s) disclosed herein. In some embodiments, the electrolyte which floods the deposition layer disclosed herein, is either the same or different from the electrolyte floods the positive electrode disclosed herein. In the event that the electrolyte which floods the deposition layer disclosed herein is different from the electrolyte floods the positive electrode disclosed herein, the two electrolytes are immiscible. In the event that the electrolyte which floods the deposition layer disclosed herein is the same as the electrolyte floods the positive electrode disclosed herein, the electrolyte disclosed herein is a catholyte.

In some embodiments, the negative electrode in the method disclosed herein is in communication with an anolyte. In some embodiments, the negative electrode in the method disclosed herein is partially or wholly flooded with the anolyte disclosed herein.

In some embodiments, the reactive gas in the method disclosed herein comprises at least one selected from the group consisting of oxygen, carbon dioxide, sulfur dioxide, and nitrogen. In some embodiments, the reactive gas disclosed herein can react with compound(s) (e.g., the compound(s) in reduced form such as rDM) in the electrolyte(s) disclosed herein to form a solid, which may be a discharge product such as $Li_2O_2$, $LiOH$, $LiOH.H_2O$, $Li_2CO_3$, $Li_2S_2O_4$, $Li_3N$, $Na_2O_2$, $NaO_2$, $Na_2CO_3$, $K_2O_2$, $KO_2$, $K_2CO_3$, $MgO$, $CaO$, $Al_2O_3$, $MnO_2$, $Fe_2O_3$, $ZnO$, etc, and the solid can react with compound(s) (e.g., compound(s) in oxidized form such as oDM) in the electrolyte(s) disclosed herein to form the gas. The gas should be identical to the discharge reactant. For example, $O_2$ is discharged to form the solid $Li_2O_2$, which then transforms back to $O_2$ upon charging.

In some embodiments, the gas phase in the method disclosed herein is any gas or gas mixture comprising or consisting of the reactive gas disclosed herein, such as air, exhaust gas, flue gas, etc.

In some embodiments, the negative electrode in the method disclosed herein comprises at least one metal selected from the group consisting of lithium, sodium, potassium, magnesium, calcium, aluminum, vanadium, chromium, manganese, iron, cobalt, nickel, copper, and zinc, and is configured for electrochemical reduction and oxidation of the at least one metal disclosed herein, while the anolyte comprises a solution of at least one salt of the metals disclosed herein.

In some embodiments, the negative electrode in the method disclosed herein comprises a conductive porous material and is configured for electrochemical reduction and oxidation of the anolyte which comprises at least one compound capable of storing ions of the at least one metal disclosed herein, $OH^-$ or $H^+$ as an active material.

In some embodiments, the positive electrode in the method disclosed herein comprises a conductive porous material and is configured for electrochemical reduction and oxidation of the catholyte which comprises at least one compound capable of storing ions of the at least one metal disclosed herein, $OH^-$ or $H^+$ as an active material.

In some embodiments, the cell in the method disclosed herein further comprises a separator separating the negative and positive electrodes disclosed herein.

In some embodiments, the separator disclosed herein allows the transfer of the at least one metal ion disclosed herein.

In some embodiments, the positive electrode and the deposition layer in the method disclosed herein are each independently flat or curved.

In some embodiments, the anolyte in the method disclosed herein is aqueous or nonaqueous.

In some embodiments, the catholyte in the method disclosed herein is aqueous or nonaqueous.

In some embodiments, the concentration of the at least one compound capable of storing ions of the at least one metal disclosed herein which is comprised in the catholyte disclosed herein is about 1 mM to 10 M (e.g., 1 mM, 1.1 mM, 1.2 mM, 2 mM, 10 mM, 100 mM, 1 M, 2 M, 5 M, 10M, etc.), 10 mM to 1 M, or 50 mM to 500 mM.

By manipulating the flux of the compound(s) (e.g., compound(s) in reduced form such as rDM), which can react with the reactive gas to form a solid, and the flux of the reactive gas, the reactive gas near the positive electrode surface is depleted and the reaction fronts of gas reduction reaction (GRR) and gas evolution reaction (GER) are moved away from the positive electrode, thereby eliminating positive electrode degradation.

In the present disclosure, a novel strategy is provided to address the positive electrode degradation problem: moving the GRR and GER reaction fronts away from the positive electrode by tuning the flux of the compound(s) (e.g., compound(s) in reduced form such as rDM), which can react with the reactive gas to form a solid, and/or the flux of the reactive gas. The design of the present disclosure isolates the positive electrode surface from numerous sources of side reactions, for example, $O_2$ and $Li_2O_2$, etc., thereby eliminates positive electrode degradation. To realize this strategy, a novel cell configuration with an electrolyte buffer layer inserted between the positive electrode and the gas phase is designed to facilitate the rebalance of the fluxes and a deposition layer is provided to support discharge products (such as $Li_2O_2$ particles, etc.) and other by-products in the electrolyte.

To quantitatively illustrate the strategy, a diffusion model is developed herein to show that the GRR reaction front can be controlled by changing at least one of the following parameters: the partial pressure of the reactive gas; discharge current; concentration of the compound(s) (e.g., compound(s) in reduced form such as rDM or compound(s) in oxidized form such as oDM) in the electrolyte(s); thickness or porosity of the deposition layer; or solubilities or diffusion coefficients of the reactive gas or the compound(s)

(e.g., compound(s) in reduced form such as rDM) in the electrolyte(s), which can react with the reactive gas to form a solid, etc.

Accordingly, the embodiments of the present disclosure provide one or more of the following advantages or characteristics:

(1) Less of the by-products (e.g., only 1.2%) forms on the positive electrode, which is in a stunning contrast to 99% in the conventional dual-mediator cell, and thereby eliminating positive electrode degradation.

(2) Protecting the positive electrode from degradation increases the cycle life of battery. The cell disclosed herein achieves an increase (e.g., a more than 10-fold increase) in cycle life compared to conventional dual-mediator cells before being limited by the negative electrode, and the positive electrode remains active after prolonged cycling.

(3) A facile and effective strategy is provided in the present disclosure to eliminate the positive electrode degradation, and long-life and efficient cells and batteries are obtained.

(4) The batteries disclosed herein have an improved cycling stability.

(5) High energy density: the batteries disclosed herein has the potential to provide higher (e.g., 2-4 times) practical gravimetric energy density than conventional Li-ion batteries.

(6) Low cost: for air batteries, given that air is available everywhere for free, the cost on active materials of Li—$O_2$ (air) batteries is only 4% of current commercial Li-ion batteries.

(7) Low requirement on materials: the present invention has substantially lower requirement on materials and hence reduces manufacturing cost. Commercially available low-cost and ordinary electrode materials can be used in the present invention. For example, excellent cycle life is achieved in the present disclosure by using commercial carbon paper as the electrode and moderate-purity solvent (99.5%) for the electrolyte. By contrast, previous reports on stable Li—$O_2$ batteries usually use either carefully engineered positive electrode material and structure or high purity solvents of >99.99% purity plus an extensive purification process (Peng, Z., Freunberger, S. A., Chen, Y, & Bruce, P. G. (2012), A reversible and higher-rate Li—$O_2$ battery. *Science*, 337(6094), 563-566; Thotiyl, M. M. O., Freunberger, S. A., Peng, Z., Chen, Y, Liu, Z., & Bruce, P. G. (2013), A stable positive electrode for the aprotic Li—$O_2$ battery. *Nature materials*, 12(11), 1050-1056.). The strategy of the present disclosure brings high flexibility in battery design to improve performance and reduce cost.

EXAMPLES

The purpose of the following specific examples is to facilitate those skilled in the art to more clearly understand and implement the present application. They should not be construed as limiting the scope of the present application, and they are merely exemplary illustrations and typical representatives of the present application.

Example 1

Working Principle

Schematic of the working principle of an illustrative example of the cell (a protected dual-mediator Li—$O_2$ cell) in the present disclosure is shown in FIG. 1. The reaction fronts of oxygen reduction reaction (ORR) and oxygen evolution reaction (OER) were pinned away from the positive electrode by manipulating the fluxes of rDM and $O_2$ gas. FIG. 1 illustrates the working principle of the protected dual-mediator Li—$O_2$ cell of the present disclosure in comparison with conventional Li—$O_2$ batteries and conventional dual-mediator cells.

In conventional Li—$O_2$ batteries without mediators (FIG. 1a), the dissolved $O_2$ is reduced on the electrode surface forming $Li_2O_2$, which has been extensively shown to react with carbon electrodes forming $Li_2CO_3$. On charging, electrochemical oxidation of $Li_2O_2$ occurs on the carbon electrode generating reactive charge intermediates such as singlet $O_2$ and $Li_{2-x}O_2$ which further decompose electrolyte and the carbon electrode.

In the conventional dual-mediator Li—$O_2$ cells (FIG. 1b), the discharge mediator (in its oxidized form, oDM for short) is reduced to rDM on the carbon surface and soon chemically reduces nearby $O_2$ molecules to $Li_2O_2$, which were shown to fully cover the positive electrode surface and accumulate passivating by-products upon cycling.

In the protected dual-mediator Li—$O_2$ cell of the present disclosure (FIG. 1c), the relative magnitudes of the outgoing rDM flux and the incoming $O_2$ flux from the gas/electrolyte interface is controlled such that the steady-state ORR front locates away from the positive electrode. Since the reaction between $O_2$ and the rDM is generally a fast reaction, when the flux of rDM is larger than that of $O_2$, the $O_2$ in the vicinity of positive electrode surface will be readily depleted and the ORR reaction becomes $O_2$-diffusion-limited, which drives the rDM/$O_2$ reaction front further away from the positive electrode. In this way, the positive electrode is protected from direct degradation associated with reactive oxygen species. In addition, a layer of porous framework acting as a physical deposition layer is placed to support the solid $Li_2O_2$ formed in the liquid electrolyte. As a result, $Li_2O_2$ will precipitate on the deposition layer instead of on the electrode, thereby avoiding degradation of the positive electrode by electrolyte decomposition products on the $Li_2O_2$ particles.

Figure 2:
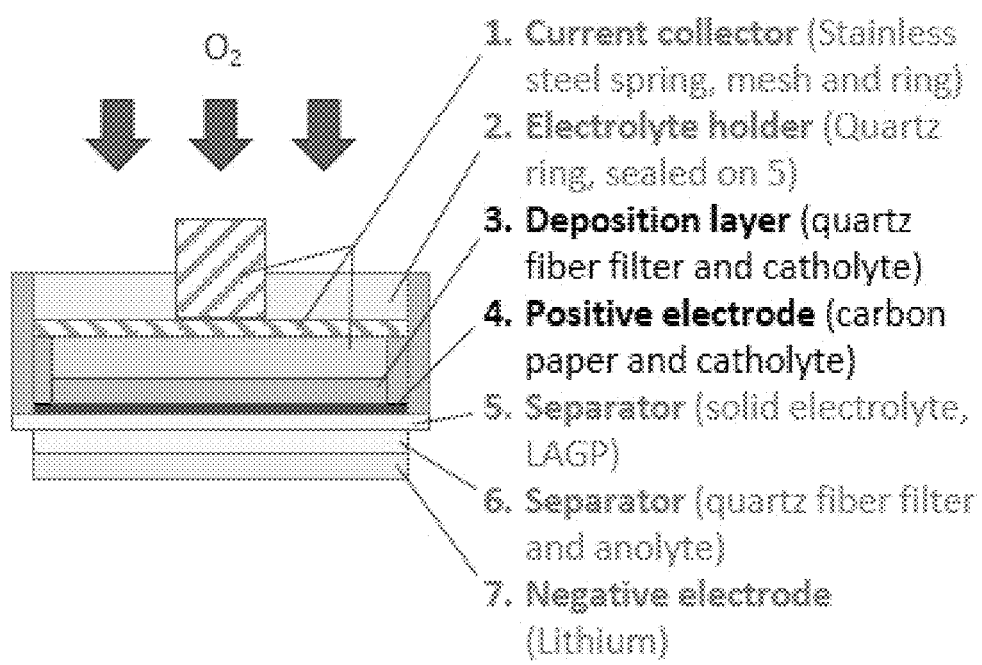
FIG. 2 is a schematic of an exemplary cell configuration of the present disclosure. Details of cell assembly is described in the method section.

An exemplary cell configuration of the present disclosure is illustrated in FIG. 2. A quartz fibre paper flooded with electrolyte containing dual mediators is placed between the positive electrode and $O_2$ entrance, serving as ORR/OER reaction sites and physical supports for $Li_2O_2$ particles. The state-of-the-art discharge mediator 2,5-di-tert-butyl-1,4-benzoquinone (DBBQ) and charge mediator (2,2,6,6-tetramethylpiperidin-1-yl)oxyl (TEMPO) are used.

Effect of the Designed Reaction Fronts

Simulations were first performed to identify operation conditions that locate the reaction front in the electrolyte deposition layer. The details of the simulation are discussed in the next section. Qualitatively, the steady state flux of rDM going away from positive electrode, which is mainly controlled by the discharge current and the diffusion coefficient of the rDM, shall be equal to the incoming flux of $O_2$, which mainly relates to $O_2$ partial pressure and $O_2$ diffusion coefficient. With fixed diffusion coefficients of DBBQLi (rDM) and $O_2$ in diglyme at room-temperature, the strategy of the present disclosure was demonstrated by lowering the $O_2$ partial pressure to 0.21 bar $O_2$ (rest balanced by Ar; identical to $O_2$ partial pressure in atmospheric air) and comparing it to a conventional 1.0 bar $O_2$ at the same current density (250 µA). These two cells were denoted as Protected (0.21 bar $O_2$) and Non-protected (1.0 bar $O_2$), respectively (FIG. 3a).

Figure 3:
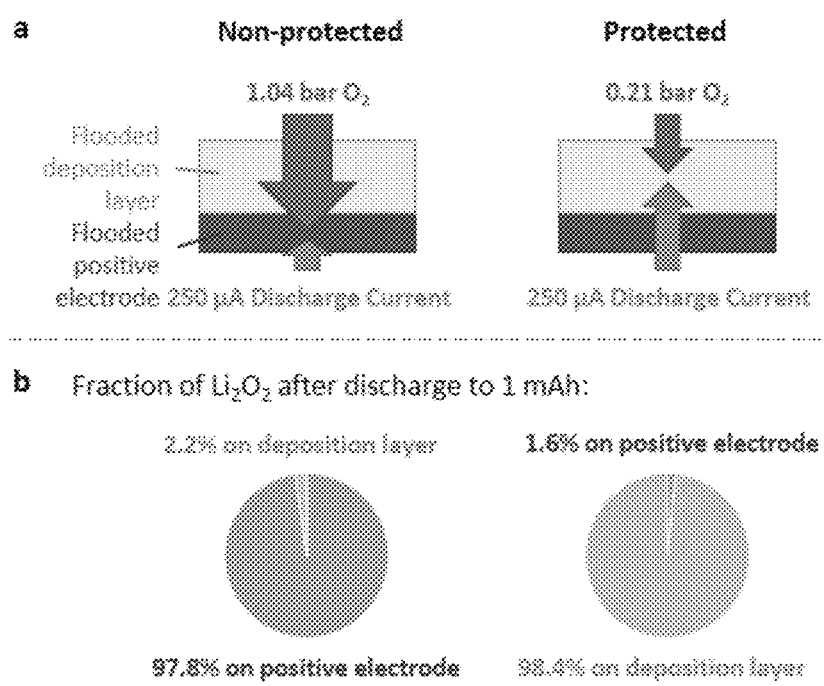
FIG. 3 is a schematic of the distribution of $Li_2O_2$ in the Non-protected cell and Protected cell of the present disclosure.
Figure 4:
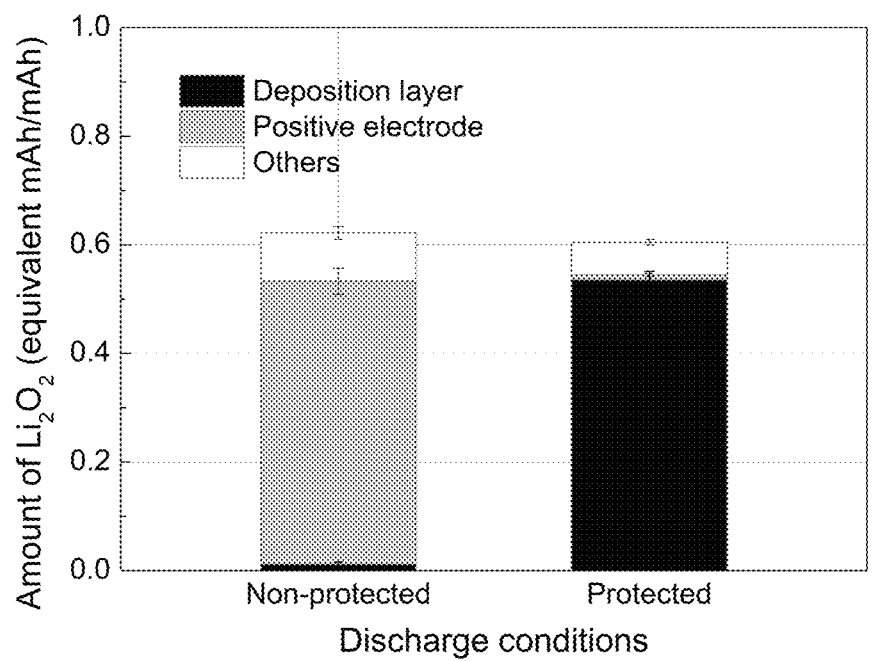
FIG. 4 shows the amount of $Li_2O_2$ in the discharge Non-protected cell and Protected cell of the present disclosure determined using $TiOSO_4$ assay. The amount of $Li_2O_2$ is translated into equivalent mAh and normalized by the net discharge capacity. Details of the quantification experiments is described in the method section.

The distribution of $Li_2O_2$ after discharge in both cells was quantified by $TiOSO_4$ assay (see Method section and FIG. 4) and summarized in FIG. 3b. In the Non-protected cell, 97.9% of the $Li_2O_2$ grows on the positive electrode. In a sharp contrast, only 1.6% of $Li_2O_2$ is found on the positive electrode in the Protected cell while 98.4% is found on the deposition layer. The extremely low fraction of $Li_2O_2$ on the positive electrode in the Protected cell verifies that pinning ORR reaction front away from the positive electrode can be achieved and effectively avoids depositing $Li_2O_2$ on the positive electrode.

Figure 5:
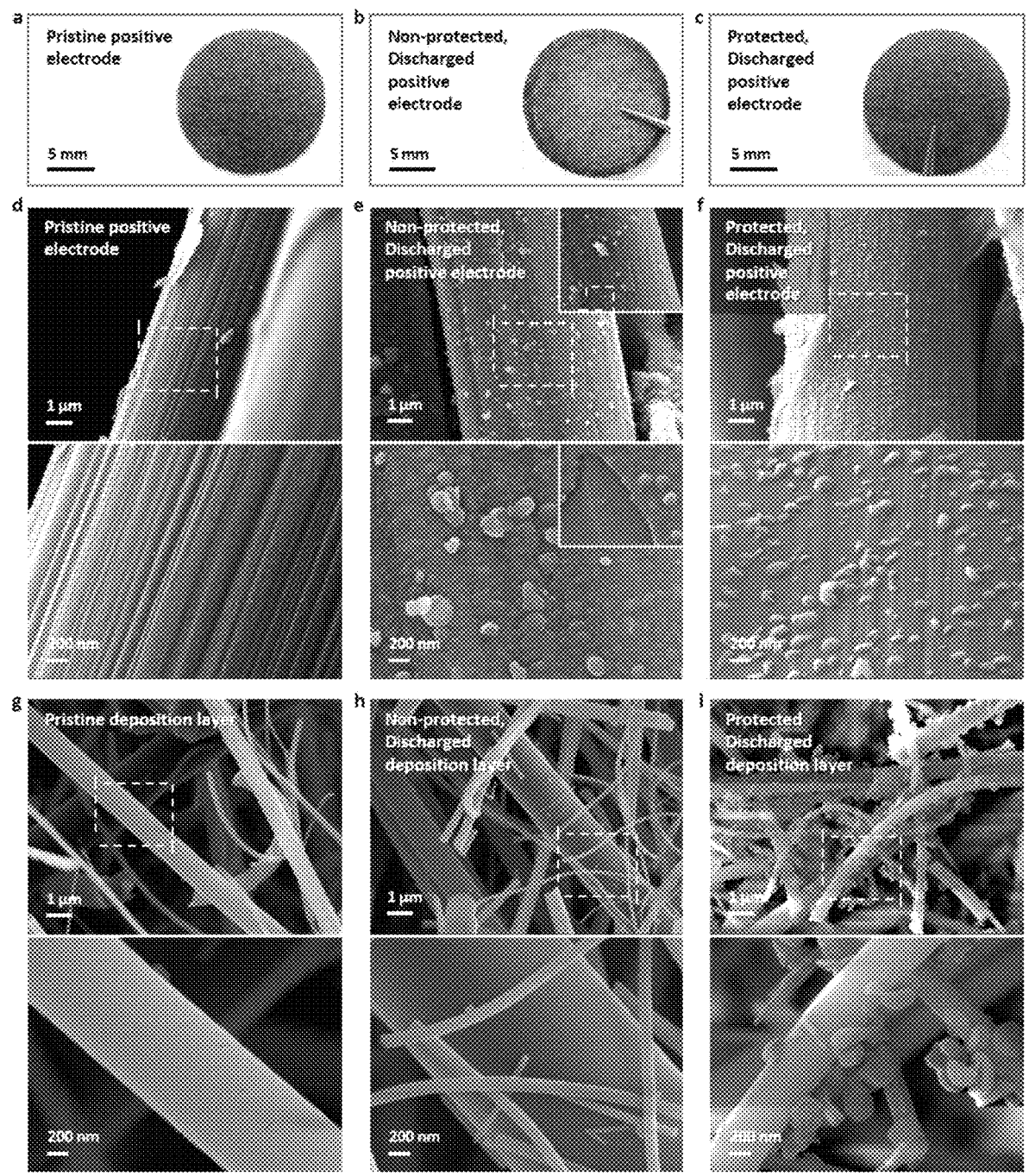
FIG. 5 shows the photographs and SEM images of the positive electrodes and deposition layers.
Figure 6:
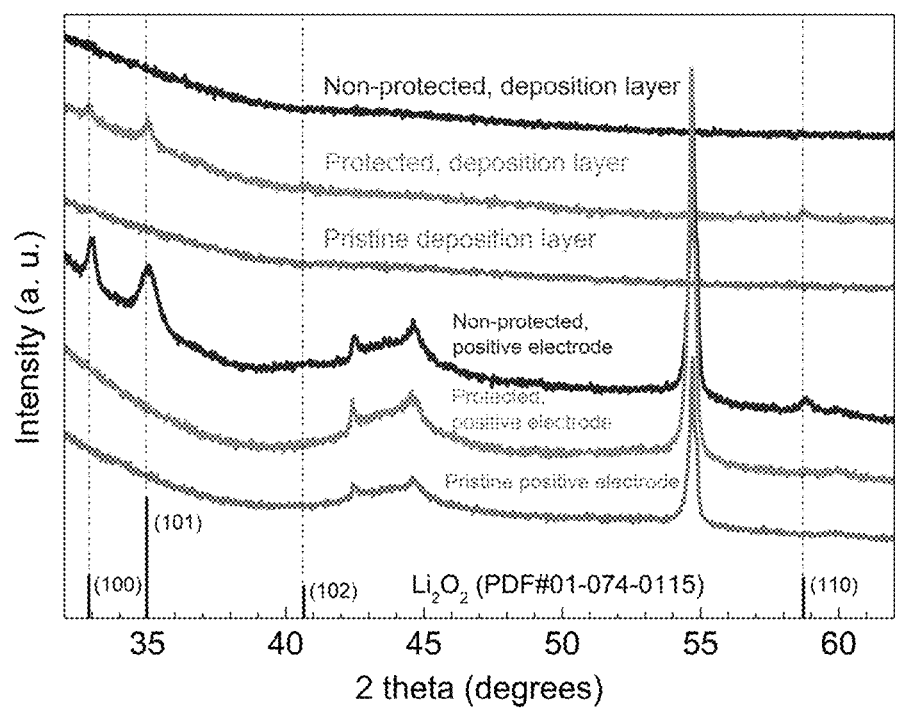
FIG. 6 shows the XRD characterization of the positive electrodes and deposition layers in the Non-protected cell and Protected cell in Example 1 of the present disclosure after the first discharge. The discharge product is confirmed to be $Li_2O_2$.
Figure 7:
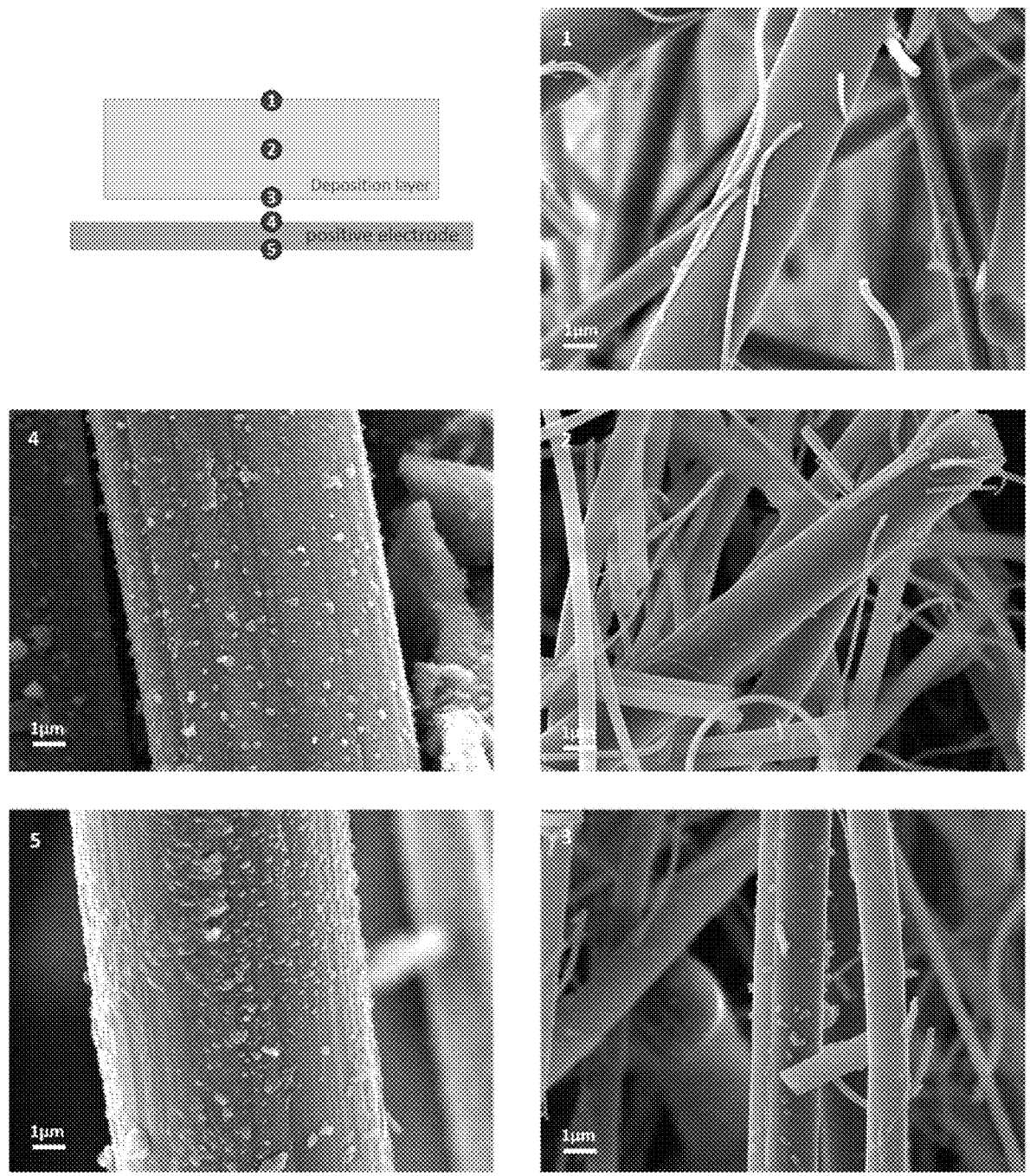
FIG. 7 is SEM images showing $Li_2O_2$ distribution along the depth in a discharged Non-protected cell.
Figure 8:
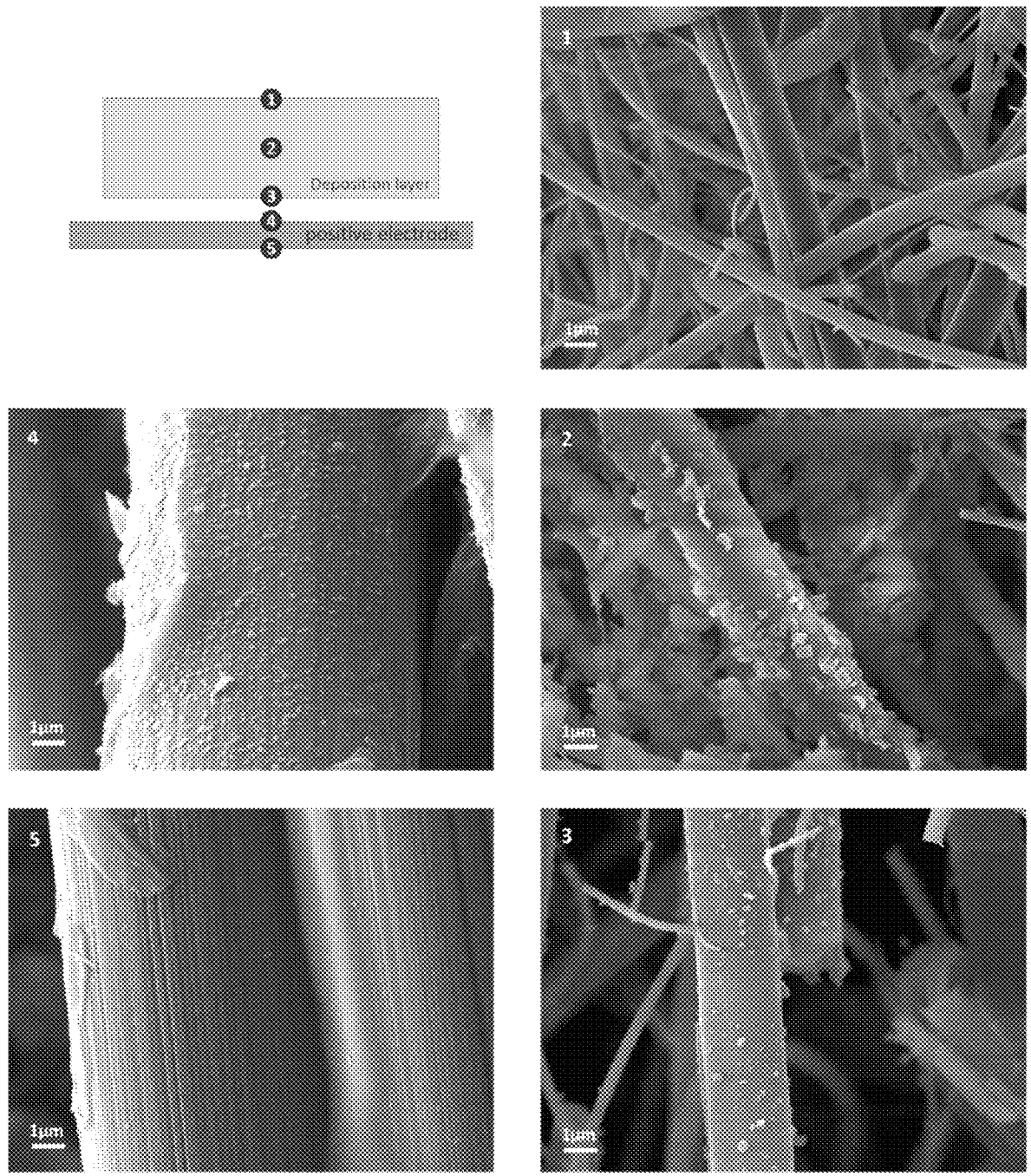
FIG. 8 is SEM images showing $Li_2O_2$ distribution along the depth in a discharged Protected cell.

The drastic difference in $Li_2O_2$ distribution in the Protected and Non-Protected cells gives rise distinct morphologies of their positive electrodes and the deposition layers. FIGS. 5b and FIG. 5c shows photographs of the discharged positive electrode from the Non-protected and the Protected cells, respectively. The Non-protected positive electrode is covered by an obvious layer of white solid, which was confirmed by XRD as $Li_2O_2$ (FIG. 6). On the contrary, the Protected positive electrode shows similar appearance to the pristine positive electrode (FIG. 5a). The $Li_2O_2$ distribution in the Non-protected and Protected cells were further compared using scanning electron microscope (SEM). After discharge, the carbon fibres on the Non-protected positive electrode (FIG. 5e) are covered by granular $Li_2O_2$ particles of 100-300 nm diameter. These particles form a densely packed layer as evidenced from a partially peeled off sample (inset in FIG. 5e). On the Protected positive electrode, a much smaller amount of $Li_2O_2$ particles are found after discharged to the same capacity (FIG. 5f). The fine texture on the surface of carbon fibres are still visible, indicating the absence of a thick $Li_2O_2$ layer. Complementary to these observations are the different $Li_2O_2$ distribution on the deposition layer. The deposition layer of the Non-protected cell (FIG. 5h) is as clean as the pristine layer (FIG. 5g), while that in the Protected cell is randomly deposited with large toroidal $Li_2O_2$ particles of diameters up to 400 nm (FIG. 5i). More SEM characterizations of distribution of $Li_2O_2$ along the depth of the two conditions are shown in FIG. 7 and FIG. 8. The distinct distributions of $Li_2O_2$ in the cells revealed by SEM resonate well with the $TiOSO_4$ assay results (FIG. 3b), both of which directly indicate that the ORR reaction front in the Protected cell is largely moved from the positive electrode into the deposition layer.

Figure 9:
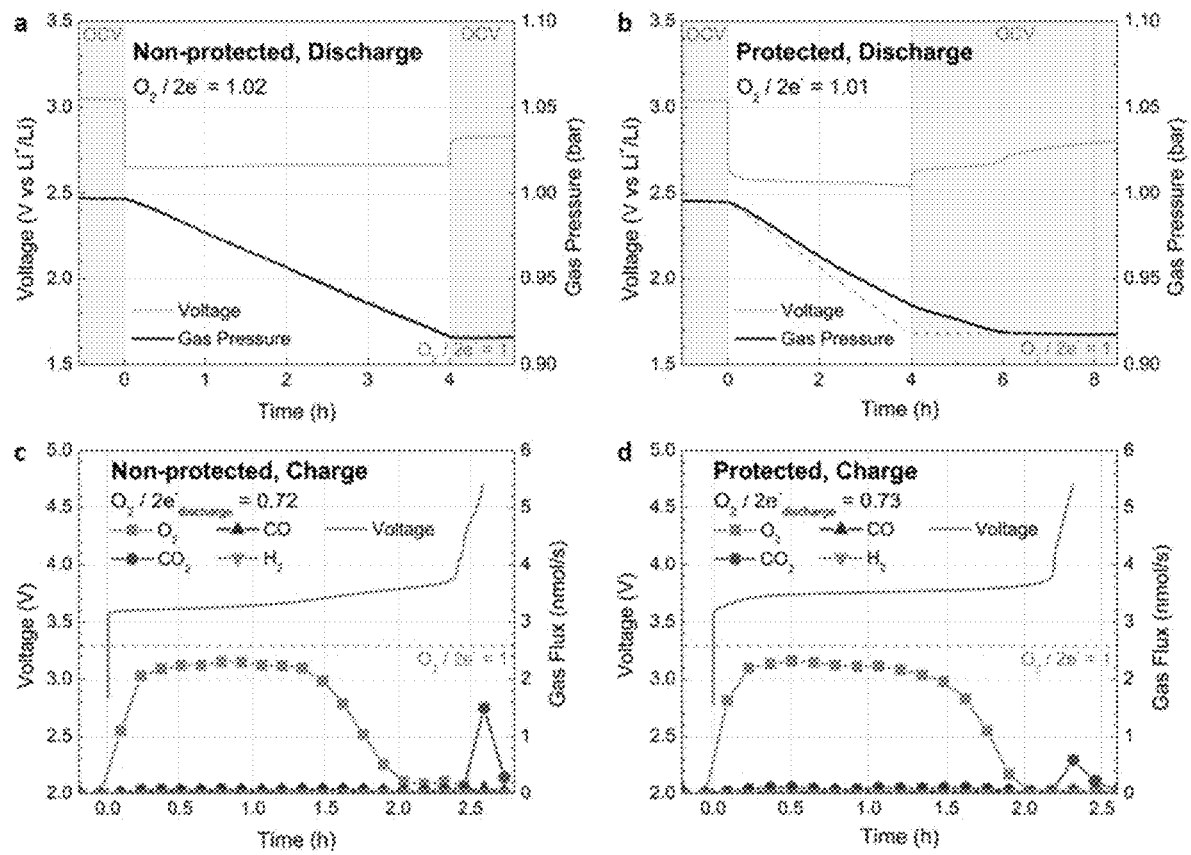
FIG. 9 shows $O_2$ consumption and evolution of the Non-protected cell and Protected cell of the present disclosure measured by OEMS.
Figure 10:
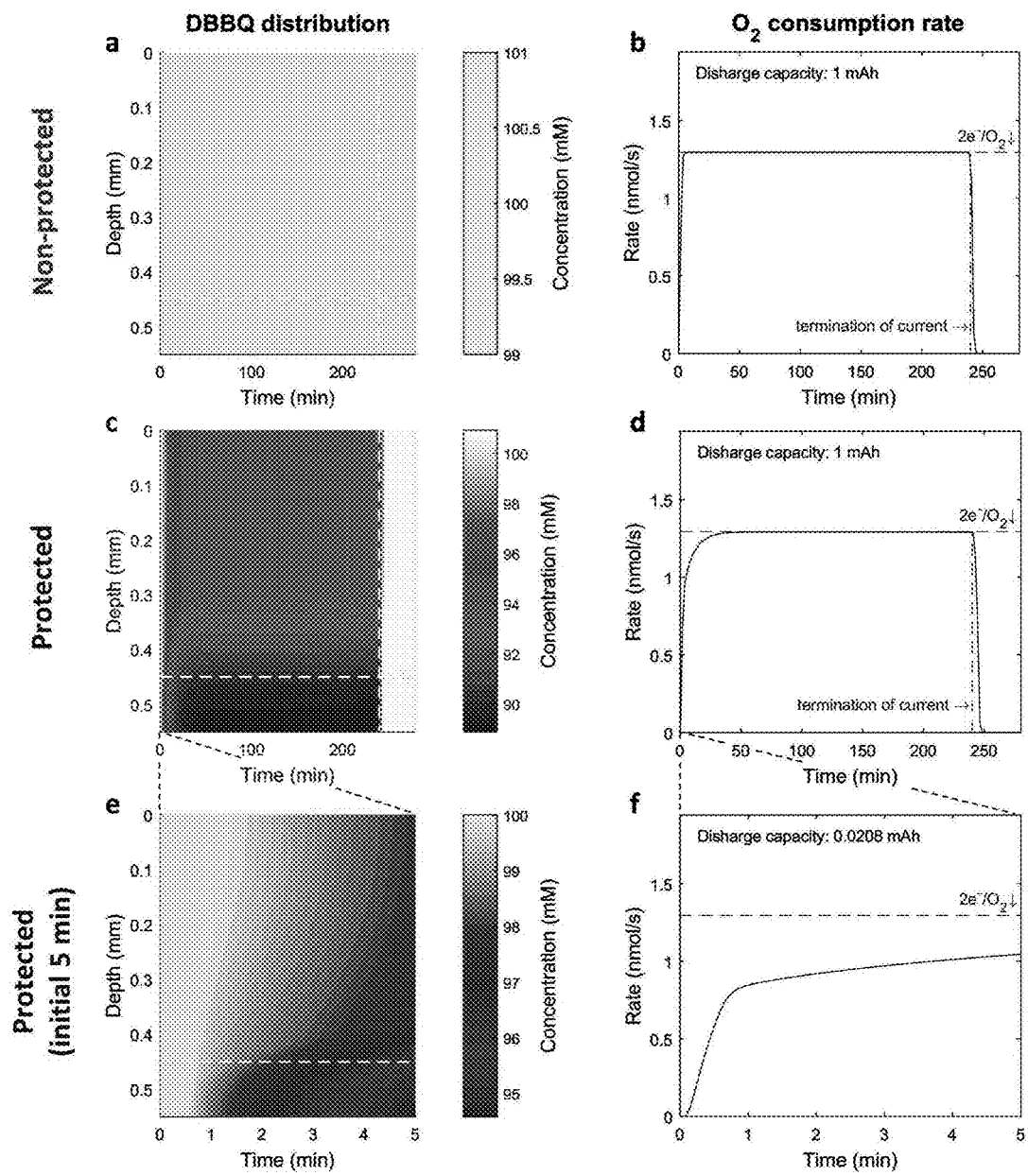
FIG. 10 shows simulation profiles of DBBQ concentration and $O_2$ consumption rate during discharge at 250 µA to 1 mAh for (FIG. 10$a$-10$b$) the Non-protected cell, (FIG. 10$c$-10$d$) the Protected cell and (FIG. 10$e$-10$f$) the Protected cell in the initial 5 min. The DBBQ profiles (FIG. 10$a$, 10$c$, 10$e$) complements the DBBQLi profiles (FIG. 14 below, FIG. 14d, 14g, 14j). In the Protected cell, as DBBQ is consumed in the positive electrode and regenerated at the ORR reaction front, a DBBQ concentration gradient is established which supplies DBBQ back to the positive electrode to support continuous discharge (FIG. 10c). The simulation predicts a gradual increase in $O_2$ uptake rate to the ideal value of 1 $O_2/2e^-$ at the beginning of discharge (FIG. 10d, 0-40 min), because the $O_2$ concentration gradient does not reach maximum until the ORR reaction front approaches its equilibrated position.
Figure 11:
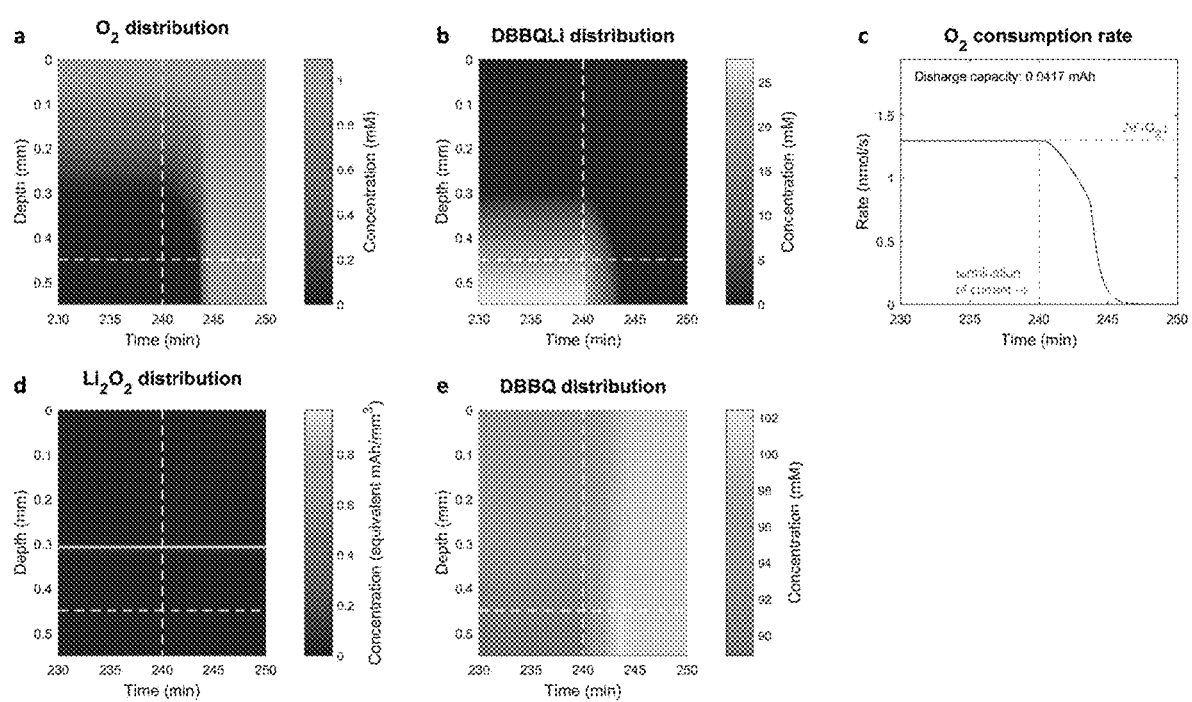
FIG. 11 shows simulated concentration profiles of $O_2$, $Li_2O_2$, DBBQLi and DBBQ as well as $O_2$ consumption rate near the end of a discharge in the Protected cell at 250 μA to 1 mAh (Zoom in at the end of FIG. 14f, 14g, 14h). The reaction front move back to the positive electrode after current termination, as $O_2$ reacts with accumulated DBBQLi (FIG. 11b) and re-saturates the electrolyte (FIG. 11a). The $O_2$ consumption profile (FIG. 11c) shows the $O_2$ uptake lag, as the ORR reaction front moves back, during which $O_2$ reacts with accumulated DBBQLi and re-saturates the electrolyte. In experiment (FIG. 9b), we observed this $O_2$ uptake lag as expected, as well as a voltage slope from 2.62 V to 2.72 V which originates from the gradual oxidation of the accumulated DBBQLi.

Oxygen consumption and evolution were confirmed as the dominating reactions in discharge and charge reactions using online electrochemical mass spectroscopy (OEMS) (FIG. 9). During discharge, the $O_2$ pressure in both the Non-protected and the Protected cells continuously decrease following a total $2e^-/O_2$ ratio, consistent with the reduction of $O_2$ to $Li_2O_2$. In the Protected cell (FIG. 9b), the delay in $O_2$ uptake and the voltage slope after discharge (from 4 h to 4.7 h) are characteristic to its unique discharge process, during which DBBQLi accumulates between the positive electrode and reaction front and then continues to react with $O_2$ after the current terminates (see FIG. 10 and FIG. 11). During charge, OER is predominately observed from both cells without parasitic gas evolutions. $Li_2O_2$ in both cells can be completely removed after charging to 4.0 V, as confirmed by the $TiOSO_4$ assay. In the OEMS experiment, the cell was intentionally charged beyond 4.0 V to 4.7 V, as a mean to probe the existence of carbonaceous by-products on the positive electrode. $CO_2$ evolution is observed in both cells, while the amount from the Protected cell is less than the Non-protected cell, suggesting reduced carbonaceous by-products.

Figure 12:
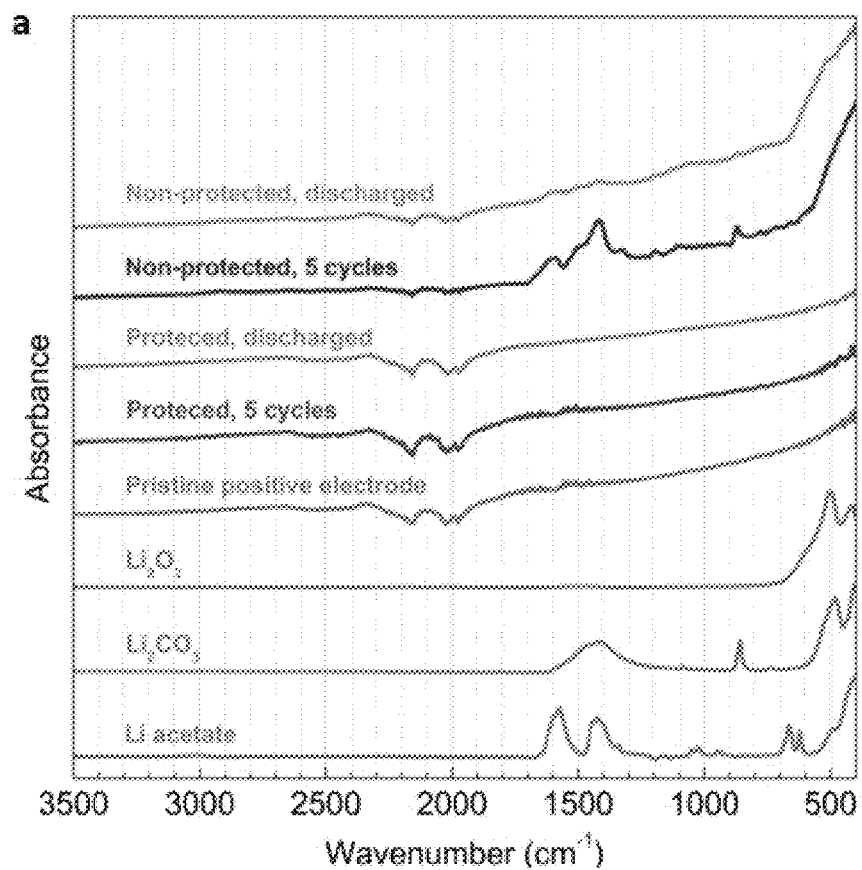
FIG. 12 shows characterization of by-product in the Non-protected and Protect cells.
Figure 12:
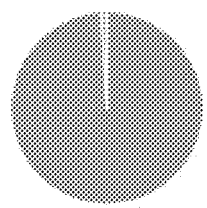
Figure 12:
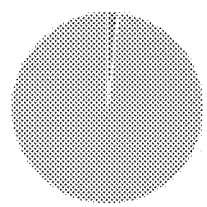

Qualitative and quantitative analyses were performed to examine the distribution and accumulation of reaction by-products. The positive electrodes from Non-protected and Protected cells were first analysed using Fourier-transform infrared spectroscopy (FTIR). As shown in FIG. 12a, both organic (lithium acetate) and inorganic decomposition products ($Li_2CO_3$) accumulate in the Non-protected positive electrode upon cycling, which is consistent with previous reports. In a strong contrast, no signs of by-product are identified on the discharged and cycled Protected positive electrode, whose FTIR spectra are indistinguishable from that of a pristine positive electrode. Then the carbonaceous by-products were quantified using Fenton's reagent (see the Methods section for details). Quantification results showed that 99.0% of by-product deposit on the positive electrode in the Non-protected cell, whereas only 1.8% of by-product deposited on the positive electrode in the Protected cell (FIG. 12b). This observation is in line with the $Li_2O_2$ distribution revealed in FIG. 3b. These results indicate that the growth and accumulation of by-products closely follow the reaction fronts, demonstrating that protecting the positive electrode from reaction fronts effectively eliminates by-product accumulation on the positive electrode.

Figure 13:
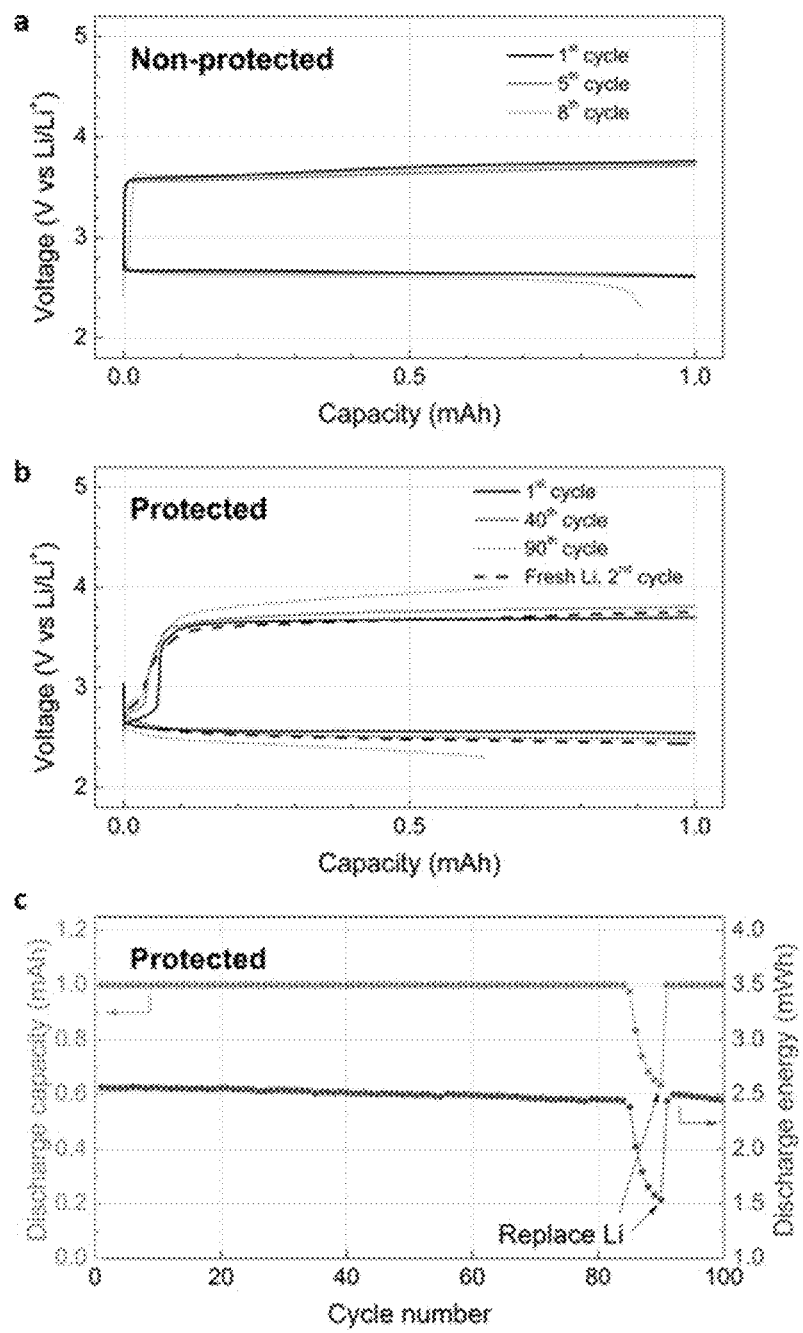
FIG. 13 shows the comparison of cycling stability.

Protecting the positive electrode from degradation significantly increases the cycle life of the battery. FIG. 13 shows the cycling voltage profiles of the Non-protected and Protected cells. The Non-protected cell (FIG. 13a) shows only 7 stable cycles before the discharge capacity starts to drop, which can be explained by the by-product accumulation on the positive electrode surface as shown earlier. The Non-protected cell here shows shorter cycle life compared to the recently reported conventional dual-mediator cell (50 cycles, see Gao X, et al, A rechargeable lithium-oxygen battery with dual mediators stabilizing the carbon positive electrode. Nat. Energy 2, 17118 (2017)). This is due to a much larger cycling current and capacity used in this study (Table 1). Remarkably, the Protected cell (FIG. 13b) shows a much longer cycle life of 84 cycles (at 69 mA/g, 275 mAh/g, 1 mAh/cycle), which is much more stable than its parallel comparison (Non-protected cell, 69 mA/g, 275 mAh/g, 1 mAh/cycle) and the recently reported dual-mediator (50 cycles, 33 mA/g, 67 mAh/g, 0.32 mAh/cycle). In fact, even after 84 cycles, the positive electrode is still active to support further cycling, which is evidenced from the voltage and capacity recovery after replacing the cycled Li negative electrode with a fresh Li negative electrode (FIG. 13b and FIG. 13c). This excellent cycling stability of the Protected positive electrode agrees with the by-product-free positive electrode surface as characterized above, demonstrating that the strategy of the present disclosure significantly improves the cycle life of Li—$O_2$ batteries.

TABLE 1

Comparison of the cycling performance between the Protected cell of the present disclosure and the reported work on conventional dual redox mediator Li-$O_2$ battery (Gao X, et al mentioned before).

| Performance indicators | Gao X, et al | The protected cell of the present disclosure |
|---|---|---|
| Absolute capacity (mAh) | 0.32 | 1.00 |
| Absolute current (mA) | 0.16 | 0.25 |
| Absolute shuffled capacity (mAh)* | 16.00 | 84.00 |
| Gravimetric capacity (mAh/g) | 66.67 | 274.89 |
| Gravimetric current (mA/g) | 33.33 | 68.72 |
| Gravimetric shuffled capacity (mAh/g) | 3,333.33 | 23,091.13 |
| Volumetric capacity (mAh/cm$^3$) | 31.75 | 64.99 |
| Volumetric current (mA/cm$^3$) | 15.87 | 16.25 |
| Volumetric shuffled capacity (mAh/cm$^3$) | 1,587.30 | 5,459.51 |
| Areal capacity (mAh/cm$^2$) | 2.00 | 0.65 |
| Areal current (mA/cm$^2$) | 1.00 | 0.16 |
| Areal shuffled capacity (mAh/cm$^2$) | 100.00 | 54.60 |

TABLE 1-continued

Comparison of the cycling performance between the Protected cell
of the present disclosure and the reported work on conventional
dual redox mediator Li-O$_2$ battery (Gao X, et al mentioned before).

| Performance indicators | Gao X, et al | The protected cell of the present disclosure |
|---|---|---|

*Note:
shuffled capacity is defined as the capacity per cycle multiplied by the cycle number.

Modelling and Simulation Analysis

Figure 14:
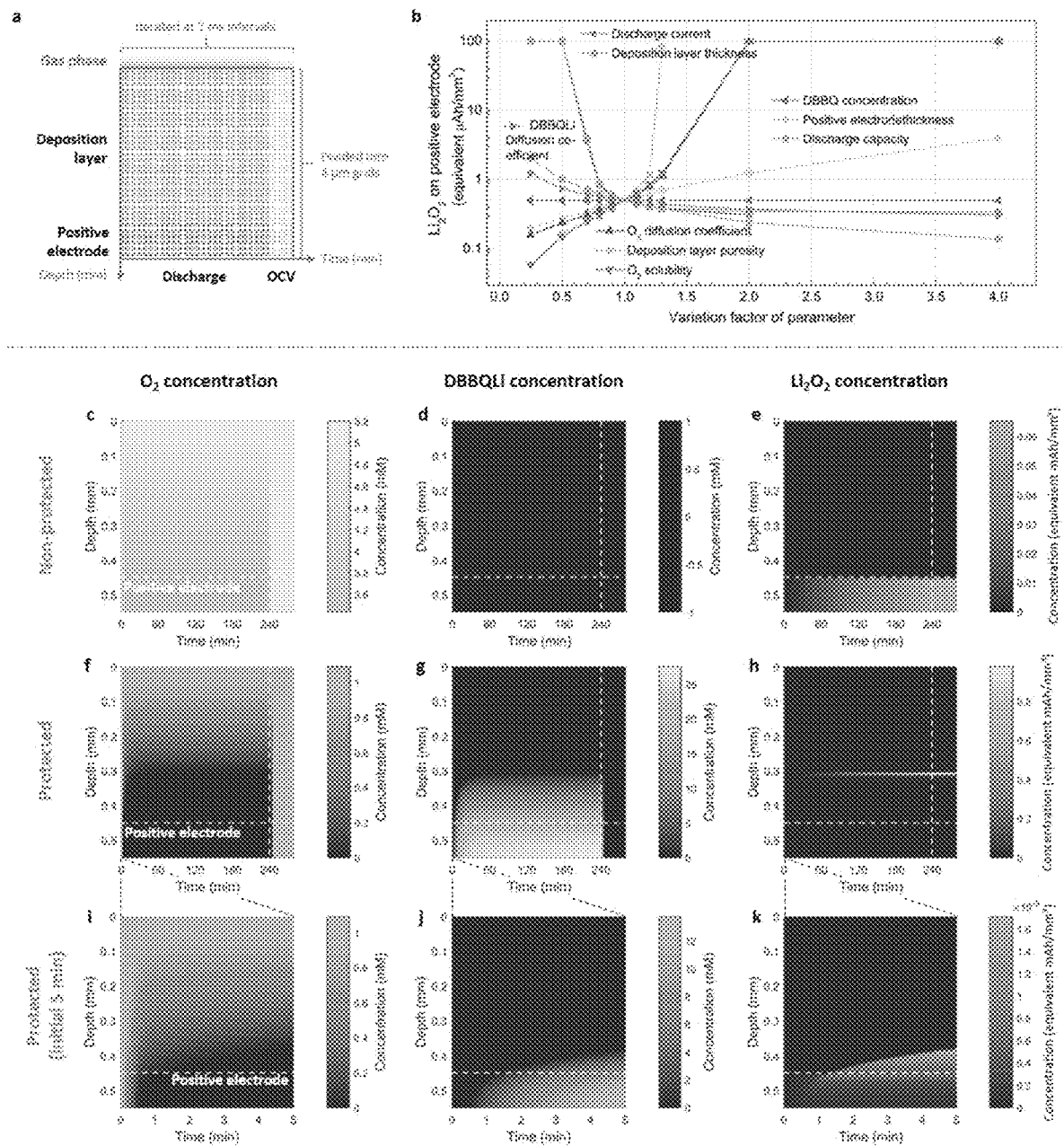
FIG. 14 shows modelling and simulation study of the discharge process on the positive electrode side.

Detailed diffusion modelling of multiple species was performed to quantitatively illustrate the control of the reaction fronts and reveal the influence of critical factors involved. The reaction fronts can be controlled by the relative fluxes of reduced discharge mediator (rDM) and O$_2$, which can be tuned via selection of electrolyte (solubility, diffusion coefficients etc.), structure of deposition layer (thickness, porosity) and other operational parameters (current density, O$_2$ pressure, mediator concentrations etc.). A model of the most relevant processes on the positive electrode side (i.e. diffusion and the chemical and electrochemical reactions) was first developed, and then the spatial and temporal evolution of the chemical species' concentrations was simulated. Details of the model is described in Supplementary Note 1. Briefly, the modelled cell consists a positive electrode, a deposition layer and a gas phase that supplies O$_2$ (FIG. 14a). The positive electrode and deposition layer are flooded with electrolyte containing DBBQ and TEMPO, reflecting the condition in the real cells. The O$_2$ in the gas phase establishes a dissolution equilibrium with the O$_2$ at the gas/electrolyte interface. Electrical current is applied to reduce or oxidize the mediators in the positive electrode, which subsequently chemically react with O$_2$ or Li$_2$O$_2$ during ORR or OER, respectively. To simulate discharge and charge processes, the deposition layer and the positive electrode are divided into 4 µm grids along the depth. The changes in the concentrations of O$_2$, Li$_2$O$_2$, DBBQ, DBBQLi, TEMPO and TEMPO$^+$ in each grid during discharge and charge are calculated at 2 ms intervals following a set of electrochemical and diffusion principles (Supplementary Note 1). Material properties used for simulation are listed in Table 2.

TABLE 2

Material properties used in simulation

| Properties | | Value | Source |
|---|---|---|---|
| Deposition layer | Thickness | 0.45 mm | Measured |
| | Porosity | 0.658 | Measured |
| | Diameter | 14 mm | Measured |
| Positive electrode | Thickness | 0.1 mm | Manufacturer |
| | Porosity | 0.75 | Manufacturer |
| Oxygen | Solubility at 1 bar O$_2$ | 5.2 mM | Gao X, et al |
| | Diffusion coefficient | 4.4 × 10$^{-5}$ cm$^2$/s | Gao X, et al |
| DBBQ | Initial concentration | 100 mM | — |
| | Diffusion coefficient | 1.2 × 10$^{-5}$ cm$^2$/s | Measured |
| DBBQLi | Initial concentration | 0 mM | — |
| | Diffusion coefficient | 2.23 × 10$^{-6}$ cm$^2$/s | Measured |
| TEMPO | Initial concentration | 100 mM | — |
| | Diffusion coefficient | 1.4 × 10$^{-5}$ cm$^2$/s | Gao X, et al |
| TEMPO$^+$ | Initial concentration | 0 mM | — |
| | Diffusion coefficient | 1.4 × 10$^{-5}$ cm$^2$/s | Assumed to be the same as TEMPO |

The simulated O$_2$, DBBQLi and Li$_2$O$_2$ concentration profiles of the Non-Protected and Protected cells are presented in FIG. 14c to FIG. 14k. In the Non-Protected cell (FIG. 14c to FIG. 14e, same condition as the tested Non-Protected cell), the simulation results show that steady-state Li$_2$O$_2$ formation occurs inside the positive electrode as evidenced from FIG. 14e. As the discharge begins at 0 min, O$_2$ starts to get consumed on the positive electrode to generate Li$_2$O$_2$. An O$_2$ concentration gradient is soon established from the electrolyte/gas interface to the positive electrode (FIG. 14c). Under the Non-Protected condition (1 bar O$_2$), the transport of O$_2$ is able to keep up with the discharge current (i.e. the rate of producing DBBQLi), and thus O$_2$ is never depleted in the positive electrode and ORR continues here. In this case, the steady-state DBBQLi concentration remains 0 mM as that DBBQLi is oxidized as soon as it meets the excess O$_2$ molecule in the positive electrode (assuming that the reaction between DBBQLi and O$_2$ finishes instantly given that this reaction is much faster than diffusions of DBBQLi). The discharge reaction continues till the termination of discharge current at 240 min at a fixed capacity of 1 mAh as used in the experiments. At the end of discharge, all Li$_2$O$_2$ is deposited on the positive electrode (FIG. 14e), which agrees well with the experiment results showing that 97.8% of Li$_2$O$_2$ deposited on the positive electrode (FIG. 3b).

Figure 15:
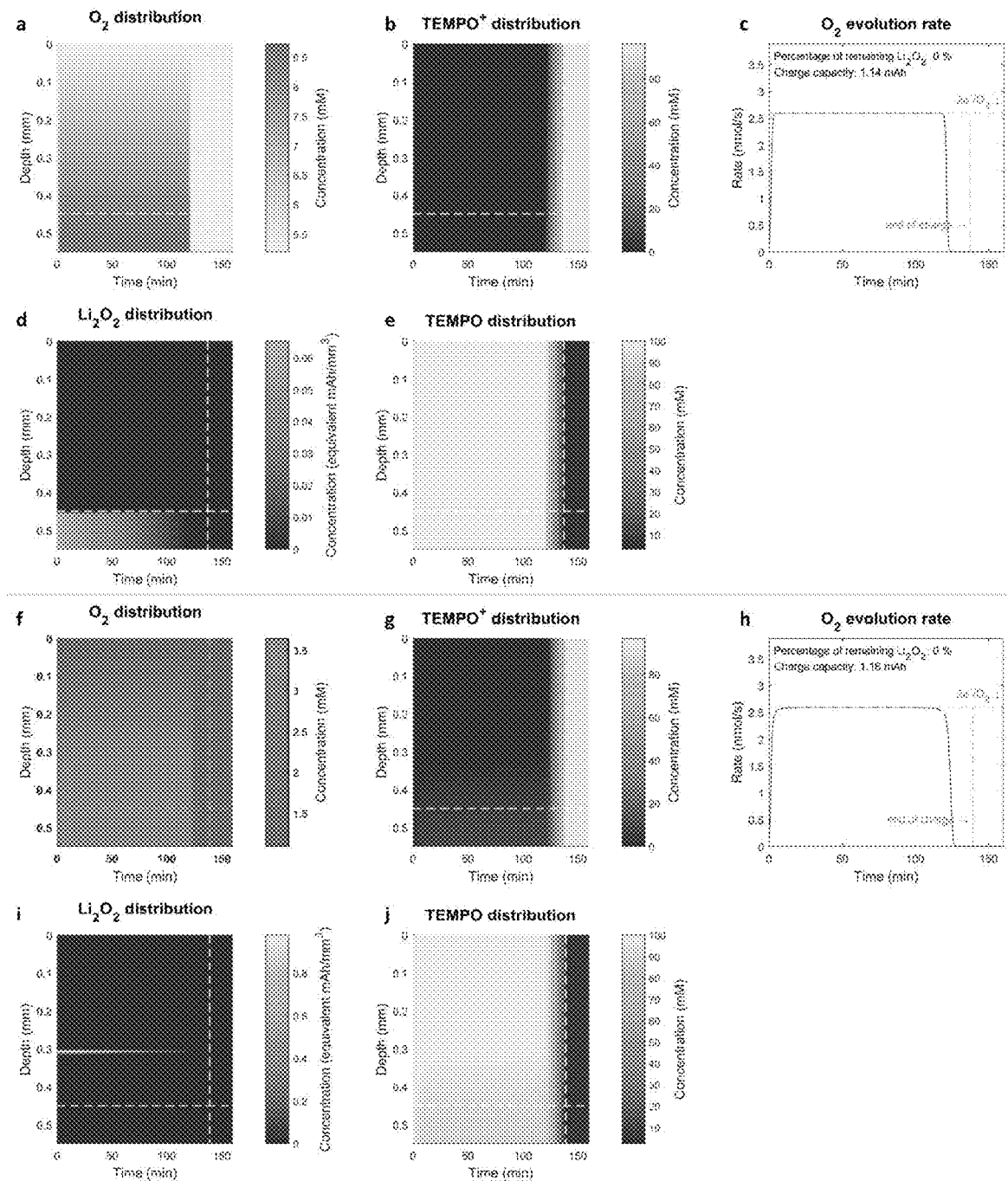
FIG. 15 shows simulated concentration profiles of $O_2$, $Li_2O_2$, $TEMPO^+$ and TEMPO, as well as $O_2$ evolution rate during charging the (FIG. 15a-15e) Non-protected and (FIG. 15f-15j) Protected cells at 500 μA. $Li_2O_2$ in both cells can be completely oxidized upon charge. The simulated gas evolution profiles (FIGS. 15c and 15h) closely resemble the $O_2$ evolution profiles obtained via OEMS (FIG. 9c and FIG. 9d).

In the Protected cell (FIG. 14f to FIG. 14h, same condition as the tested Protected cell), the simulation results show that steady-state Li$_2$O$_2$ formation mainly occurs about 0.1 mm away from the edge of the positive electrode (FIG. 14h). At the very beginning of discharge, the initial dissolved O$_2$ in the positive electrode region will react with DBBQLi forming a small amount of Li$_2$O$_2$ in the positive electrode. To quantify this, we zoom into the first 5 min of the discharge reaction as shown in FIG. 14i to FIG. 14k. The results show that the O$_2$ in the Protected cell's positive electrode is depleted at the first 0.5 min (FIG. 14i). The depletion of O$_2$ starts from the bottom of the positive electrode, where the DBBQLi begins to accumulate (FIG. 14j). Meanwhile the ORR reaction front follows the O$_2$/DBBQLi interface moving away from the positive electrode (FIG. 14k). At 1.4 min the ORR reaction front completely leaves the positive electrode, at which point Li$_2$O$_2$ stops growing on the positive electrode. Gradually, the ORR reaction front moves further away from the positive electrode into the deposition layer at the depth of 0.31 mm (FIG. 14h), where the flux of O$_2$ equals to the flux of DBBQLi, and thus most of the Li$_2$O$_2$ deposition occurs at this position. Finally, at the end of discharge, only 0.5% of $Li_2O_2$ has grown on the positive electrode (calculated from data of FIG. 14h), which is reasonably consistent with the experiment result of 1.6% (FIG. 3b). Simulation results of the subsequent charging show that $Li_2O_2$ can be completely removed (FIG. 15) for both cells, which is consistent with our experimental results of $TiOSO_4$ assay on the charged positive electrodes and deposition layers showing no absorbance at 410 nm. In addition, the simulated gas evolution profiles (FIG. 15, FIGS. 15c and 15h) closely resemble the $O_2$ evolution profiles obtained via OEMS (FIG. 9c and FIG. 9d).

Further simulations were performed to reveal the influences of various design factors on the effectiveness of the protecting effect, which we define as the amount of $Li_2O_2$ deposited on the positive electrode per discharge, as shown in FIG. 14b. The horizontal axis denotes the changes in the indicated parameter with respect to its original value (Table 2). The parameters investigated here fall into three types. The first type contributes to the $O_2$ flux, which includes $O_2$ solubility, $O_2$ diffusion coefficient and deposition layer porosity. As expected, the amount of $Li_2O_2$ formed in the positive electrode decreases substantially with the decrease of these three parameters (FIG. 14b, blue symbols). In other words, further reducing the amount of $Li_2O_2$ in the positive electrode can be achieved by lower $O_2$ partial pressure (suitable for operating in atmospheric $O_2$ pressure), smaller $O_2$ Henry constant of the electrolyte, or smaller $O_2$ diffusion coefficient. The second type of parameter contributes to the DBBQLi flux or hinders the $O_2$ flux, including discharge current, DBBQLi diffusion coefficient and deposition layer thickness. With the increase of these parameters, the amount of $Li_2O_2$ formed on positive electrode decreases and then plateaus (FIG. 14b, orange symbols). These results indicate that the design of the present disclosure is inherently suitable for high discharge rate. The third type of parameter does not directly affect either $O_2$ or DBBQLi fluxes (e.g. positive electrode thickness, DBBQ concentration, discharge capacity) and therefore have limited effects on the protection (FIG. 14b, grey symbols). Comprehensive simulation provides quantitative guidelines on tuning cell and testing parameters to enable protected dual-mediator Li—$O_2$ batteries via designed reaction fronts, which offer significantly improved cycle life compared to conventional Li—$O_2$ and dual-mediator Li—$O_2$ batteries.

In the present disclosure, cycling stability of Li—$O_2$ batteries is significantly improved by pinning the ORR and OER reaction fronts away from the positive electrode by quantitatively controlling the fluxes of rDM and $O_2$. The reaction fronts are successfully moved from positive electrode to the deposition layer in the protected dual-mediator cell, as evidenced by only 1.6% of $Li_2O_2$ deposited on the positive electrode and 98.4% on the deposition layer, which is in strong contrast of 97.8% of $Li_2O_2$ deposited on the positive electrode and 2.2% on the deposition layer in the conventional dual-mediator cell. In addition, the amount of by-product deposited on positive electrode is reduced compared with a conventional dual-mediator cell (1.2% vs 99%). As a result, the protected dual-mediator cell demonstrates more than 10-fold increase in cycle life compared with its parallel comparison in conventional dual-mediator Li—$O_2$ configuration. Comprehensive simulation modelling was developed to provide quantitative design guidelines to further improve the effectiveness of the demonstrated approach.

Methods

Materials. DBBQ (Sigma-Aldrich, 99%), $LiOH \cdot H_2O$ (Sinopharm Chemical Reagent), $Al_2O_3$ (Sigma-Aldrich), $GeO_2$ (Sinopharm Chemical Reagent), and $NH_4H_2PO_4$ (Sinopharm Chemical Reagent) were used as received. Lithium bis(trifluoromethane)sulfonimide (LiTFSI, Sigma-Aldrich, 99.95%), carbon paper (HCP010N, Shanghai Hesen Electric Co., Ltd.) and quartz fibre filters (QM-A, Whatman) were dried at 150° C. for 12 h in a glass oven (Büchi, Germany) under dynamic vacuum before being transferred to the glovebox without exposure to the ambient atmosphere. Diethylene glycol dimethyl ether (diglyme, Sigma-Aldrich, anhydrous, 99.5%) and TEMPO (Sigma-Aldrich, 98%) was stored over activated molecular sieve (Sigma-Aldrich, 5 Å). All chemicals were stored in a glovebox (Etelux, China) where both $H_2O$ and $O_2$ concentration are below 1.0 ppm. The water content of diglyme was determined by Karl Fischer titration (TitroLine 7500 KF, SI Analytics) to be below 10.0 ppm. Anolyte was prepared by dissolving 1 M LiTFSI in diglyme, while catholyte was prepared by dissolving 100 mM DBBQ and 100 mM TEMPO in anolyte.

Synthesis of the $Li^+$-conducting solid electrolyte. The NASICON-type $Li_{1.5}Al_{0.5}Ge_{1.5}(PO_4)_3$ (LAGP) $Li^+$-conducting solid electrolyte was synthesize employing a solid-state reaction method as reported in literature. Stoichiometric amounts of $LiOH \cdot H_2O$ (with 15 wt % excess), $Al_2O_3$, $GeO_2$ and $NH_4H_2PO_4$ were first ball-milled in acetone at 400 rpm for 12 h and then heated at 600° C. for 2 h. After cooled, the mixture was ball-milled and heated at 800° C. for 6 h. The resulting mixture was then ball-milled to powder and pressed into pellets for sintering at 850° C. for 6 h. $Li^+$ conductivity of the solid electrolyte is $4 \times 10^{-4}$ S $cm^{-1}$ at room temperature.

Cell assembly. A hermetic-sealed cell with gas inlet and outlet was used. The negative electrode side of the cell was assembled by placing a quartz fibre filter (Ø 16 mm) onto a piece of lithium (Ø 16 mm), then added with 120 μl of anolyte. A bow comprising a quartz ring (outer Ø 19 mm, inner Ø 16 mm) sealed on a solid electrolyte (LAGP, Ø 19 mm) using silicone glue served as the separator between the negative electrode and positive electrode sides to prevent the cross-over of the redox mediators. The positive electrode side, which was assembled by stacking a stainless steel (SS) ring (outer Ø 16 mm, inner Ø 14 mm) and a quartz fibre filter (Ø 14 mm, deposition layer) onto a piece of carbon paper (Ø 16 mm, positive electrode), was placed into the bow, then added with 120 μl of catholyte. On the SS ring stacks a SS mesh (Ø 16 mm) and a SS spring. This ring+mesh+spring structure provide electric contact between the cell top and the carbon paper with minimum disturbance on the reaction (the edge of the electrolyte layer may have different concentration profiles compared to the centre areas), making the positive electrode side closer to the 1-Dimentional model in simulation study.

Electrochemical tests. The Non-protected cells were tested in pure $O_2$ (N5.0, Linde HKO). The Protected cells were tested in 21% $O_2$ (rest balanced by Ar, mixed using mass flow controller from pure $O_2$ and pure Ar, N5.0, Linde HKO). All cells were rested for 1 to 2 h prior to discharge. For charged sample preparation, cells were discharged at the designated conditions, and then charged to 3 V to mimic the situation in cycling, without oxidizing the $Li_2O_2$ generated. For charged sample preparation, cells were discharged and then charged to 4 V. For cycled sample preparation, each cycle comprises a discharge and a charge, followed by a discharge at 250 μA to 3 V and hold for 1 h or until current drops below 10 μA to reduce oxidized TEMPO. In long term cycling the gas was wetted in a diglyme-DBBQ-TEMPO solution (diglyme:DBBQ:TEMPO=0.2 ml:10 mg:0.85 ml, diglyme was used to keep the mixture in liquid form at room temperature) before flowing through the cell to reduce the loss of the highly volatile DBBQ and TEMPO via vaporization.

SEM, XRD, FTIR characterization and by-product quantification. Cells after electrochemical tests were dissembled in the glovebox. The positive electrode and deposition layer were taken out of the cell before gently washed using about 0.2~0.4 ml diglyme until the yellowish colour of the catholyte faded. These samples were then dried under vacuum before test. SEM images were obtained on a Quanta 400 FEI scanning electron microscope after sputtering the samples with Pt for 10 s at 10 mA to enhance electric conductivity. XRD measurements were conducted on a Rigaku SmartLab diffractometer (Cu Kα radiation) at a scan rate of 2° min$^{-1}$. FTIR tests were conducted in the glovebox using a Bruker ALPHA in ATR mode. Reference spectra of pristine positive electrode, $Li_2O_2$, $Li_2CO_3$ and Li acetate were measured in the same way. By-products in cell components were quantified following established procedures (Ottakam Thotiyl M M, Freunberger S A, Peng Z, Bruce P G. The carbon electrode in nonaqueous Li—O2 cells. *J. Am. Chem. Soc.* 135, 494-500 (2013)). In each test, a sample positive electrode or deposition layer was placed together with a stir bar into a modified OEMS cell that has an injection hole on its top, before transferred out of the glovebox and connected to the OEMS system. When the OEMS signal is stable, Fenton's reagent (a mixture of 0.3 ml aqueous solution containing 2M $H_3PO_4$, 0.5M $FeSO_4$ and 20 μL of 30% $H_2O_2$) was injected into the cell with the stir bar stirring and the gas evolution was recorded by OEMS.

$Li_2O_2$ quantification. Cells after electrochemical tests were dissembled in the glovebox. The deposition layer was then taken out of the cell. In the quartz-LAGP bow remains some catholyte-solid mixture, which was detached from the positive electrode, deposition layer, the gap between deposition layer and SS ring, and the gap between SS ring and quartz ring. To remove the solid that attached onto the positive electrode during its lift up, the positive electrode was gently washed using 0.2 ml diglyme. This effluent from washing was combined with the mixture in the quartz-LAGP bow to form the 'Others' sample. The deposition layer, positive electrode and 'Others' were dried under vacuum. The dried samples were then mixed with 1 ml $TiOSO_4$ solution in vials, followed by filtration using PTFE filters. The absorbance at 410 nm was then measured using a UV-Vis spectrometer (SEC2000, ALS Co., Ltd).

OEMS characterization. OEMS tests were conducted as reported (Liang Z, Lu Y-C. Critical role of redox mediator in suppressing charging instabilities of lithium-oxygen batteries. *J. Am. Chem. Soc.* 138, 7574-7583 (2016)). For ORR, the assembled cell was connected to a pressure transducer which monitors the pressure reduction during discharge under 1 bar $O_2$. For the gas consumption quantification experiment of the Protected cell, the gas was circulated with a peristaltic pump to minimize $O_2$ pressure drop below 0.21 bar due to uneven distribution of $O_2$. For OER, Ar carrier gas continuously transfers the gas evolved during charge to a mass spectrometer for analysis (QMS 200, Stanford Research Systems). Quantification of gas was calibrated using a standard gas mixture of $O_2$, $CO_2$, CO, $H_2$, and $H_2O$ (5000 ppm each, rest balanced by Ar).

Supplementary Note 1

The simulation models a 1-D system consisting of four phases: gas|deposition layer|positive electrode, and the electrolyte, which contains $O_2$, $Li_2O_2$, DBBQ, DBBQLi, TEMPO and TEMPO$^+$, flooding the deposition layer and the positive electrode. The flooded part is divided into small grids (4 μm by default), and the evolution of the grid properties is simulated by iterated calculation of the changes between small time gaps (2 ms by default).

The simulation models the following processes:
1. Electrochemical reduction of $O_2$ and DBBQ, and oxidation of $Li_2O_2$ and TEMPO on the positive electrode
2. Diffusion of the soluble species, including $O_2$, DBBQ, DBBQLi, TEMPO and TEMPO$^+$, in the electrolyte
3. Chemical reaction between DBBQLi and $O_2$, and between TEMPO$^+$ and $Li_2O_2$ in the electrolyte
4. Sedimentation of $Li_2O_2$ in the deposition layer
5. Dissolution and escape of $O_2$ at the gas/electrolyte interface These processes are discussed in detail as follows:

Electrochemical reduction of $O_2$ and DBBQ, and oxidation of $Li_2O_2$ and TEMPO on the positive electrode: in positive electrode grids $O_2$ and DBBQ are reduced into $Li_2O_2$ and DBBQLi during discharge, while $Li_2O_2$ and TEMPO are oxidized into $O_2$ and TEMPO$^+$ during charge:

$$O_2 + 2Li^+ + 2e^- \rightarrow Li_2O_2$$

$$DBBQ + Li^+ + e^- \rightarrow DBBQLi$$

$$Li_2O_2 \rightarrow O_2 + 2Li^+ + 2e^-$$

$$TEMPO \rightarrow TEMPO^+ + e^-$$

These reactions are coupled with Faradaic current:

$$i = F\frac{dn}{dt}$$

Where i is current, F is Faraday constant, n is the amount of species in mole and t is time. Since the limiting process in this system is diffusion instead of reaction, for simplicity these electrochemical reactions are assumed to finish instantly.

Diffusion of the soluble species, including $O_2$, DBBQ, DBBQLi, TEMPO and TEMPO$^+$, in the electrolyte: these species diffuse in the liquid phase following Fick's law of diffusion:

$$J = -D\frac{\epsilon_{int}}{\tau}\frac{dc}{dx}$$

Where J is the flux, D is the diffusion coefficient, $$\epsilon_{int} = \frac{2}{\frac{1}{\epsilon_1} + \frac{1}{\epsilon_2}}$$

is the average porosity of adjacent grids, $\tau = \epsilon_{int}^{-0.5}$ is the tortuosity between grids, c is the concentration of species and x is position.

The concentration and diffusion of Li$^+$ is omitted.

Chemical reaction between DBBQLi and $O_2$, and between TEMPO$^+$ and $Li_2O_2$ in the electrolyte: chemical reactions occur when DBBQLi and $O_2$ or TEMPO$^+$ and $Li_2O_2$ are present in the same grid.

$$2DBBQLi + O_2 \rightarrow 2DBBQ + Li_2O_2$$

$$2TEMPO^+ + Li_2O_2 \rightarrow 2TEMPO + O_2$$

As $Li_2O_2$ formation and decomposition changes the porosity in grids, the concentrations of soluble species are modified with their total amounts in the grids kept constant.

Figure 16:
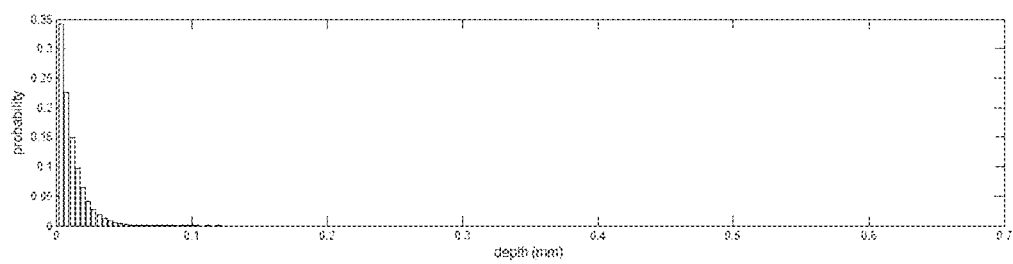
FIG. 16 shows a sedimentation distribution of $Li_2O_2$ in a deposition layer which only contains fibres of 4 μm diameter.
Figure 17:
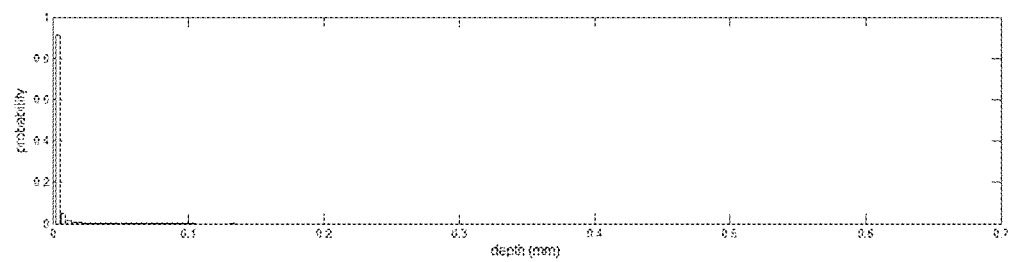
FIG. 17 shows the sedimentation distribution in the real deposition layer.

Sedimentation of $Li_2O_2$ in the deposition layer: when $Li_2O_2$ is generated at the reaction front in the electrolyte, it deposits on nearby fibres of the deposition layer, while some particles which are not closed to any fibres sediment due to gravity. Because of the existence of the deposition layer, each $Li_2O_2$ particle eventually stops on a fibre of the deposition layer. This process is simulated as follows:

1. Generating a sedimentation distribution on a quartz fibre deposition layer which only contains fibres of 4 μm diameter. Firstly, an array of grids is filled with randomly distributed '1's (standing for fibres) according to the porosity of the deposition layer. For example, a 138-element (0.55 mm/4 μm≈138) array containing randomly distributed 91 (138*0.658≈91) '1's and 47 (138−91=47)) '0's is generated. Secondly, the index of the first nonzero element is recorded, considered as the position where a falling particle first meets a fibre. Thirdly, the first and second steps are repeated 100,000 times to obtain a distribution of the sedimentation probability. FIG. 16 shows a sedimentation distribution of $Li_2O_2$ in a deposition layer which only contains fibres of 4 μm diameter:

2. Generating a sedimentation distribution for mixed fibre diameters. According to SEM image of the deposition layer, the fibres can be roughly categorized as following: 4 μm (5%), 2 μm (6%), 1 μm (6%), 0.8 μm (9%), 0.5 μm (14%), 0.25 μm (6%). The sedimentation distribution obtained above is scaled to obtain distributions with different fibre diameters. Their linear weighted sum represents the sedimentation distribution (which is shown in FIG. 17) in the real deposition layer (and the positive electrode as well, for simplicity).

3. Simulating $Li_2O_2$ sedimentation according to the distribution. The $Li_2O_2$ generated in any grids is relocated according to the above distribution right after generation. About 91% of $Li_2O_2$ sediments within the grid it is generated, while about 8% sediments in the next 16 μm.

Dissolution and escape of $O_2$ at the gas/electrolyte interface: at the first grid (the one with depth=0 mm) of the electrolyte, the concentration of $O_2$ is set as constant at the saturation concentration under the specified $O_2$ pressure, regardless the diffusion of $O_2$ from or to the second grid. In this way, the first grid acts as a $O_2$ source or sink. The amount of $O_2$ that diffuses into or out of this grid is plotted verses time to give the $O_2$ evolution or consumption profile to simulate the OEMS results.

Example 2

Figure 18:
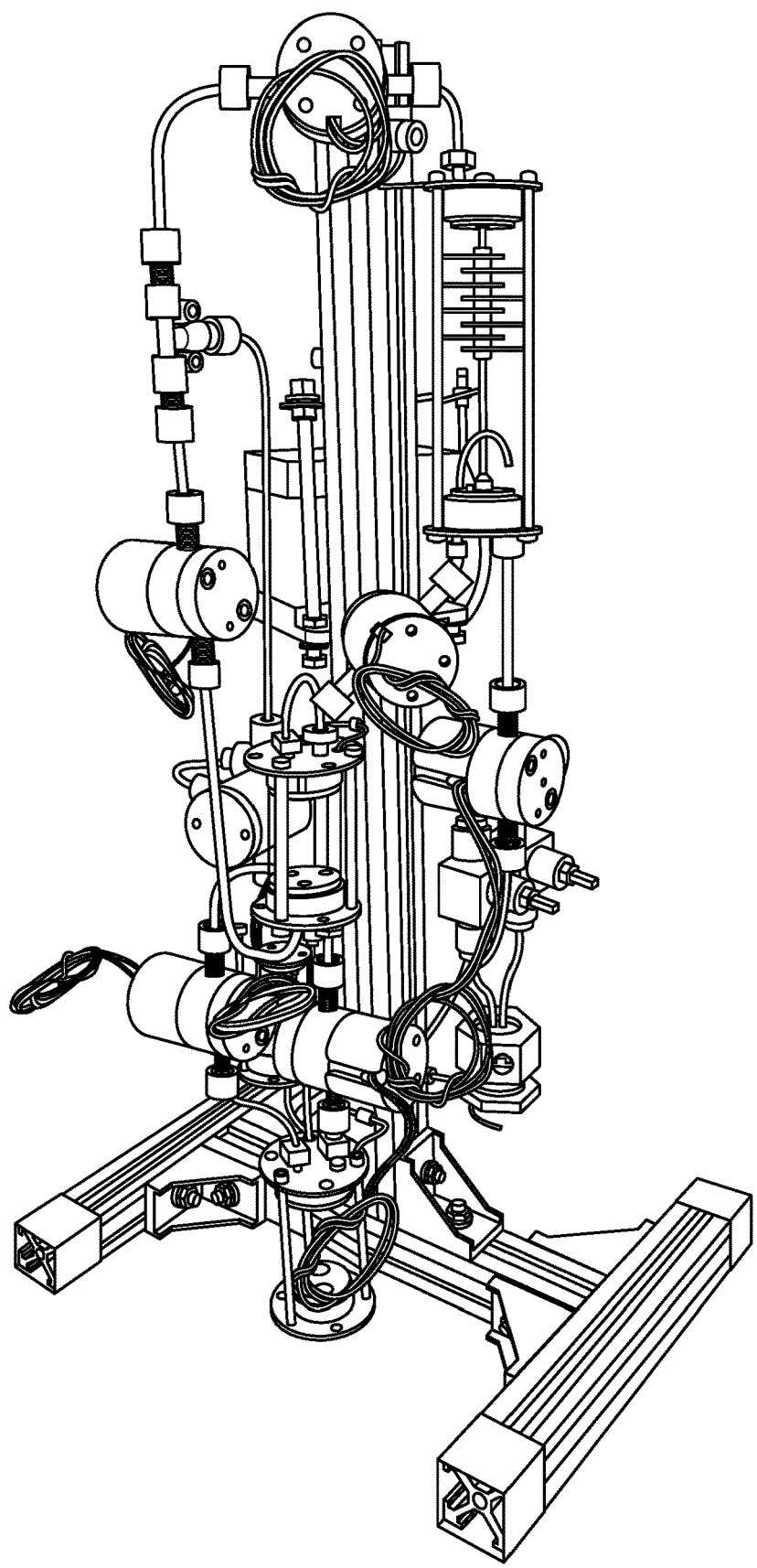
FIG. 18 shows a photo of the prototype of the battery comprising a cell, a gas-liquid reactor, a container and a storage tank.

Here we provide a photo of the prototype of the battery comprising a cell, a gas-liquid reactor, a container and a storage tank (FIG. 18).

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the principles and novel features disclosed herein. Further, any reference to claim elements in the singular, for example, using the articles "a," "an," or "the," is not to be construed as limiting the element to the singular.

What is claimed is:

1. A battery comprising:
   a cell comprising a negative electrode in communication with an anolyte and a positive electrode in communication with a catholyte;
   a gas-liquid reactor configured to receive a first portion of the catholyte from the cell, in which the gas-liquid reactor is also configured to receive a gas;
   a gas flow controller that is configured to regulate a flow rate of the gas based on a discharge current; and
   a container configured to receive an effluent from the gas-liquid reactor, receive a second portion of the catholyte from the cell, and store a mixture of the second portion of the catholyte and the effluent from the gas-liquid reactor, wherein the container is configured to provide an effluent of the container to the cell.

2. The battery according to claim 1, wherein the negative electrode is partially or wholly flooded with the anolyte, and/or the positive electrode is partially or wholly flooded with the catholyte.

3. The battery according to claim 2, wherein the catholyte and the anolyte are each independently aqueous or nonaqueous.

4. The battery according to claim 1, wherein the catholyte is fed to the gas-liquid reactor in batches, and the gas is also fed to the gas-liquid reactor.

5. The battery according to claim 1, wherein the catholyte is fed to the gas-liquid reactor continuously, and the gas is also fed to the gas-liquid reactor.

6. The battery according to claim 1, wherein the gas fed to the gas-liquid reactor comprises at least one selected from the group consisting of oxygen, carbon dioxide, sulfur dioxide, and nitrogen.

7. The battery according to claim 6, wherein the gas fed to the gas-liquid reactor can react with compound(s) in the catholyte to form a solid and the solid can react with compound(s) in the catholyte to form said gas.

8. The battery according to claim 7, wherein said compound(s) in the catholyte, which can react with the reactive gas to form a solid, is compound(s) in reduced form, wherein said compound(s) in reduced form is a reduced discharge mediator (rDM).

9. The battery according to claim 7, wherein said compound(s) in the catholyte, which can react with said solid, is compound(s) in oxidized form, wherein said compound(s) in oxidized form is an oxidized charge mediator (oDM).

10. The battery according to claim 1, wherein the negative electrode comprises at least one metal selected from the group consisting of lithium, sodium, potassium, magnesium, calcium, aluminum, vanadium, chromium, manganese, iron, cobalt, nickel, copper, and zinc, and is configured for electrochemical reduction and oxidation of said at least one metal, while the anolyte comprises a solution of at least one salt of said metals.

11. The battery according to claim 10, wherein the negative electrode comprises a conductive porous material and is configured for electrochemical reduction and oxidation of the anolyte which comprises at least one compound capable of storing ions of said at least one metal, $OH^-$ or $H^+$ as an active material.

12. The battery according to claim 10, wherein the positive electrode comprises a conductive porous material and is configured for electrochemical reduction and oxidation of the catholyte which comprises at least one compound capable of storing ions of said at least one metal, $OH^-$ or $H^+$ as an active material.

13. The battery according to claim 10, wherein the negative electrode and the positive electrode are separated by a separator, and the separator allows the transfer of said at least one metal ion.

14. The battery according to claim 1, further comprising:
a liquid flow controller which regulates the catholyte flow;
a current meter which records the electric current flow in the cell; and
a processing unit which adjusts the gas flow controller and the liquid flow controller after sensing the dynamic current flow.

15. The battery according to claim 14, wherein the catholyte is fed to the gas-liquid reactor in batches, and the gas is also fed to the gas-liquid reactor; wherein the feeding amount of the gas to the gas-liquid reactor and the feeding amounts of catholyte to the gas-liquid reactor and the container are regulated using the process unit according to the generation amount of active material in the form of the catholyte in the cell such that the gas in the container is reacted completely or at least almost completely; the feeding amount of the active material in the form of the catholyte is determined by discharge current as measured by the current meter and by the liquid flow as controlled by the liquid flow controller, and the feeding amount of the gas is controlled by the gas flow controller.

16. The battery according to claim 14, wherein the catholyte is fed to the gas-liquid reactor in batches, and the gas is also fed to the gas-liquid reactor;
when part of the catholyte from the cell is fed to the gas-liquid reactor, the fraction of catholyte fed to the gas-liquid reactor ranges from 1% to 70%, and the rest of catholyte is combined with the effluent of the gas-liquid reactor in the container.

17. The battery according to claim 16, the fraction of catholyte fed to the gas-liquid reactor ranges from 50% to 70%.

18. The battery according to claim 16, the fraction of catholyte fed to the gas-liquid reactor ranges from 1% to 50%.

19. The battery according to claim 16, wherein the rest of catholyte is evenly mixed with the effluent of the gas-liquid reactor in the container.

20. The battery according to claim 14, wherein the catholyte is fed to the gas-liquid reactor continuously, and the gas is also fed to the gas-liquid reactor; wherein the feeding rate of the gas to the gas-liquid reactor and the feeding rates of catholyte to the gas- liquid reactor and the container are regulated according to the generation rate of active material in the form of the catholyte in the cell such that the gas in the container is reacted completely or at least almost completely; the feeding rate of the active material in the form of the catholyte is determined by discharge current, and the feeding rate of the gas is controlled by the gas flow controller.

21. The battery of claim 1, further comprising a processing module configured to process the effluent of the gas-liquid reactor in a process comprising at least one of heating, pressure reduction, or even mixture with a second gas,
wherein the second gas comprises at least one of carbon dioxide, sulfur dioxide, or nitrogen, and
wherein the container is configured to receive the effluent from the processing module after the effluent has been processed in the process comprising at least one of heating, pressure reduction, or even mixture with the second gas.

22. The battery of claim 21 in which the processing module is configured to process the effluent of the gas-liquid reactor in a process comprising even mixture with the second gas comprising at least one of carbon dioxide, sulfur dioxide, or nitrogen.

23. A battery comprising:
a cell comprising a negative electrode in communication with an anolyte and a positive electrode in communication with a catholyte;
a gas-liquid reactor connected to the cell and configured to receive a first portion of the catholyte from the cell, in which the gas-liquid reactor is also configured to receive a gas;
a gas flow controller that is configured to regulate a flow rate of the gas based on a discharge current;
a processing module connected to the gas-liquid reactor and configured to process an effluent of the gas-liquid reactor in a process comprising at least one of pressure reduction or even mixture with a second gas, wherein the second gas comprises at least one of carbon dioxide, sulfur dioxide, or nitrogen; and
a container connected to the processing module and configured to receive the effluent from the processing module after the effluent has been processed in the process comprising at least one of pressure reduction or even mixture with the second gas, wherein the container is configured to provide an effluent of the container to the cell.

* * * * *